United States Patent
Li et al.

(10) Patent No.: US 11,503,523 B2
(45) Date of Patent: Nov. 15, 2022

(54) NETWORK HANDOVER METHOD, APPARATUS AND SYSTEM, AND HANDOVER DETERMINATION METHOD AND APPARATUS

(71) Applicant: ZTE CORPORATION, Guangdong (CN)

(72) Inventors: Zhendong Li, Shenzhen (CN); Jinguo Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/970,173

(22) PCT Filed: Apr. 15, 2019

(86) PCT No.: PCT/CN2019/082665
§ 371 (c)(1),
(2) Date: Aug. 14, 2020

(87) PCT Pub. No.: WO2019/158132
PCT Pub. Date: Aug. 22, 2019

(65) Prior Publication Data
US 2021/0105685 A1    Apr. 8, 2021

(30) Foreign Application Priority Data
Feb. 14, 2018    (CN) .......................... 201810151813.9

(51) Int. Cl.
*H04W 36/14*    (2009.01)
*H04W 36/00*    (2009.01)
(Continued)

(52) U.S. Cl.
CPC ....... *H04W 36/14* (2013.01); *H04W 36/0022* (2013.01); *H04W 36/08* (2013.01); *H04W 48/16* (2013.01)

(58) Field of Classification Search
CPC . H04W 36/14; H04W 36/0022; H04W 36/08; H04W 48/16; H04W 36/0011
(Continued)

(56) References Cited

U.S. PATENT DOCUMENTS 10,425,230 B1    9/2019  Tang et al.
2011/0250869 A1  10/2011 Mahajan
(Continued)

FOREIGN PATENT DOCUMENTS

CN    101674621 A    3/2010
CN    105517077 A    4/2016
(Continued)

OTHER PUBLICATIONS

International Search Report of Patent Application No. PCT/CN2019/082665 and its English Translation—4 pages (Jun. 28, 2019).
(Continued)

*Primary Examiner* — Michael Y Mapa
(74) *Attorney, Agent, or Firm* — Knobbe, Martens, Olson & Bear, LLP

(57) ABSTRACT

A network handover method includes: receiving a first handover request sent by a source base station connected to the core network of the first network, wherein the first handover request is used for requesting a handover of a user equipment from the source base station to a target base station, and the target base station is connected to at least one of the core network of the first network or a core network of a second network; determining, according to the first handover request, a core network of a target network accessed by the UE through the target base station, wherein the core network of the target network is the core network of the first network or the core network of the second network; and initiating the handover of the UE between the source base
(Continued)

station and the target base station according to the core network of the target network.

14 Claims, 12 Drawing Sheets

(51) Int. Cl.
*H04W 36/08* (2009.01)
*H04W 48/16* (2009.01)

(58) Field of Classification Search
USPC .................................. 455/436–444; 370/331
See application file for complete search history.

(56) References Cited

U.S. PATENT DOCUMENTS

| | | |
|---|---|---|
| 2017/0286768 A1 | 10/2017 | Livesay et al. |
| 2019/0159074 A1* | 5/2019 | Velev ................ H04W 36/0058 |
| 2019/0159088 A1* | 5/2019 | Shi .................... H04W 36/0061 |
| 2019/0333054 A1 | 10/2019 | Cona et al. |
| 2020/0280893 A1* | 9/2020 | Liu ....................... H04W 88/08 |

FOREIGN PATENT DOCUMENTS

| | | |
|---|---|---|
| CN | 105517086 A | 4/2016 |
| CN | 105532035 A | 4/2016 |
| CN | 106416362 A | 2/2017 |
| CN | 106455060 A | 2/2017 |
| CN | 107018542 A | 8/2017 |
| CN | 107302777 A | 10/2017 |
| CN | 107396397 A | 11/2017 |
| CN | 107431966 A | 12/2017 |
| JP | 2008-287701 | 11/2008 |
| JP | 2018-537022 | 12/2018 |
| JP | 2019-506103 | 2/2019 |
| JP | 2019-097148 | 6/2019 |
| JP | 6592573 | 10/2019 |
| WO | 2012/044365 A1 | 4/2012 |
| WO | WO 2017/062244 A1 | 4/2017 |
| WO | WO 2018/053749 A1 | 3/2018 |

OTHER PUBLICATIONS

First Search Report for CN App No. 201810151813.9.
First Office Action for CN App No. 201810151813.9.
Supplemental Search Report for CN App No. 201810151813.9.
Qualcomm Incorporated, et al., "TS 23.502: Network sharing in NG RAN (OI#25)," SA WG2 Meeting #123, Oct. 23-27, 2017—S2-177166.

* cited by examiner

NETWORK HANDOVER METHOD, APPARATUS AND SYSTEM, AND HANDOVER DETERMINATION METHOD AND APPARATUS

This application claims priority to Chinese patent application No. 201810151813.9 filed with China National Intellectual Property Administration on Feb. 14, 2018, disclosure of which is incorporated herein by reference in its entirety.

TECHNICAL FIELD

The present application relates to the field of communications, and specifically, to a network handover method, apparatus and system, and a network handover determination method and apparatus.

BACKGROUND

The 3rd Generation Partnership Project (3GPP) began to develop a fourth-generation (or Long Term Evolution (LTE)) mobile communication system from Release 8 (R8). The 3GPP began to study the next generation communication system (NextGen System) from R14, and formally formulated the 5G system specification in R15.

The NextGen System (5G for short hereinafter) will be deployed locally in hotspots such as downtown and commercial centers. When a UE accesses the 5G system, as the user of the UE moves outside of the coverage of the 5G system, the UE may be handed over to the 4G system to ensure continuity of the user service (the IP address remains unchanged).

FIG. 1 is a network architecture diagram of bidirectional handover of a user equipment between a 4G network and a 5G network in the related art. A core feature of the architecture is that it is compatible with 4G and 5G architectures at the same time. The core feature lies in a combination of a Packet Data Network GateWay-Control plane (PDN GateWay-Control, PGW-C) and an SMF, a combination of a Packet Data Network GateWay-Control (PDN GateWay-User plane, PGW-U) and a UPF, a combination of a PCF and a PCRF, and the user plane of the UE being always anchored on the UPF/PGW-U. An N26 interface for sending an inter-system handover request is added between an AMF and a Mobility Management Entity (MME). In this way, when the UE is handed over between the LTE network and the 5G network, a seamless handover can be ensured. The network elements in the architecture are described below.

The user equipment (UE) accesses the 4G network or 5G network and obtains services mainly via a wireless air interface. The UE interacts with a base station via the air interface, and interacts with a management entity of a core network via non-access stratum (NAS) signaling (the UE interacts with the mobility management entity (MME) during accessing to the 4G network and interacts with a access and mobility control function (AMF) and a session management function (SMF) during accessing to the 5G network).

A 4G radio access network (RAN) base station (eNB) is responsible for air interface resource scheduling and air interface connection management for the UE to access the network.

A 5G radio access network (NG RAN) base station is responsible for air interface resource scheduling and air interface connection management for the UE to access the network. The NG RAN base station (gNB) may adopt a new radio access technology or an evolved LTE technology (eLTE).

The Mobility Management Entity (MME) serving as a 4G core network control plane entity is mainly responsible for user authentication, authorization and subscription checking, user mobility management, PDN connection, bearer maintenance, paging triggering in a user IDLE state, and other functions.

A serving gateway (GW) serving as a 4G core network user plane functional entity is mainly responsible for an interaction with a packet data network gateway (PDN GW) in the case of roaming.

The Packet Data Network GateWay (PDN GW) serving as a 4G core network user plane functional entity is an access point for the UE to access the PDN, and is responsible for user IP address allocation, network-triggered bearer establishment, modification and deletion, QoS control and charging and other functions. The PDN GW is an anchor of the user in the 3GPP system, and thus the IP address is ensured to be unchanged and service continuity is ensured. In a control and forwarding separation architecture, the PDN GateWay (P-GW) is further divided into two parts. One is the control entity, i.e., PGW-C, and the other is the user plane entity, i.e., PGW-U. The PGW-C is responsible for signaling control and the PGW-U is responsible for IP forwarding.

A home subscription server (HSS) stores subscription information of the user.

The policy and charging control function (PCRF) is responsible for formulating policy decisions and charging rules. The PCRF provides network control rules based on service data flows. The network control includes service data flow detection, gating control, Quality of Service (QoS) control, a charging rule based on data flows, and the like. The PCRF sends the policies and charging rules formulated by the PCRF itself to the P-GW for execution.

Control functions of the 5G network are described below.

A session management function (SMF) interacts with the UE, and is mainly responsible for processing requests of user packet data unit (PDU) session establishment, modification and deletion, selecting user plane functions (UPFs), establishing a user plane connection between the UE and the UPF, determining session Quality of Service (QoS) parameters together with a policy control function (PCF), and the like.

An access and mobility control function (AMF) is a common control plane function in the core network. A user has merely one AMF. The one AMF is responsible for user authentication, authorization, and subscription checking to ensure that a user is a legitimate user; user mobility management including location registration and temporary identity allocation; selecting an appropriate SMF when the user initiates a PDU session establishment request; forwarding the Non-Access Stratum (NAS) signaling between the UE and the SMF; and forwarding access stratum (AS) signaling between the base station and the SMF.

The User Plane Function (UPF) provides user plane processing functions, including data forwarding and QoS execution. When the user moves, the UPF also provides the user plane anchor to ensure service continuity.

The Policy Control Function (PCF) provides the authorization function of resources, which is similar to the PCRF of the 4G era.

A unified data management (UDM) function stores subscription data of the user, which is similar to the HSS of the 4G era.

In order to ensure the continuity of UE handover between 4G and 5G systems:

In the 4G system, a PDN connection established between the UE and the network includes one default bearer and multiple dedicated bearers. Information of each bearer includes corresponding service flows and QoS parameters thereof. In the 5G system, a PDU session established between the UE and the network includes one default QoS flow and multiple dedicated QoS flows. Each QoS flow includes corresponding service flows and QoS parameters, such as a QoS profile and a packet filter.

When the handover from the 5G system to the 4G system is performed, the PDU session established in the 5G system is converted to the PDN connection in the 4G system. The QoS flow in the PDU session is converted to a bearer in the 4G system, and vice versa.

SUMMARY

The embodiments of the present disclosure provide a network handover method. The network handover method includes: a mobility management function in a core network of a first network receives a first handover request sent by a source base station connected to the core network of the first network, wherein the first handover request is used for requesting a handover of a user equipment (UE) connected to the source base station from the source base station to a target base station, and the target base station is connected to at least one of the core network of the first network or a core network of a second network; the mobility management function determines, according to the first handover request, a core network of a target network accessed by the UE through the target base station after the handover, wherein the core network of the target network is the core network of the first network or the core network of the second network; and the mobility management function initiates the handover of the UE between the source base station and the target base station according to the core network of the target network.

Optionally, in response to the UE accessing the core network of the first network through the target base station, the mobility management function initiates an intra-system handover; and in response to the UE accessing the core network of the second network through the target base station, the mobility management function initiates an inter-system handover.

Optionally, the first handover request carries information for indicating the core network of the target network.

Optionally, the mobility management function sends a handover preference type of the target network to the source base station, wherein the handover preference type is used for indicating the core network of the first network or the core network of the second network.

Optionally, in a case where the first handover request carries information for indicating the core network of the target network, the mobility management function determines a core network accessed by the UE through the target base station after the handover is the core network of the target network.

Optionally, in a case where the first handover request does not carry information for indicating the core network of the target network, determining, by the mobility management function, a core network accessed by the UE through the target base station after the handover is a core network indicated by the handover preference type.

Optionally, in a case where the mobility management function fails to determine, according to the first handover request, the core network of the target network accessed by the UE through the target base station after the handover, sending, by the mobility management function, a second handover request to the source base station; receiving, by the mobility management function, response information sent in response to the second handover request by the source base station, wherein the response information is used for indicating the core network of the target network; and determining, by the mobility management function, that a core network accessed by the UE through the target base station after the handover is the core network of the target network indicated by the response information.

Optionally, in a case where the core network of the first network is a core network of a 5G network, the core network of the second network is a core network of a 4G network; and in a case where the core network of the first network is the core network of the 4G network, the core network of the second network is the core network of the 5G network.

Optionally, in a case where the first network is a 4G network, the mobility management function is a mobility management entity (MME); and in a case where the first network is a 5G network, the mobility management function is an access and mobility control function (AMF).

Another embodiment of the present disclosure provides a network handover determination method. The network handover determination method includes: receiving, by a source base station connected to a core network of a first network, a measurement report sent by a user equipment (UE) to determine a target base station to which a handover is to be performed, wherein the target base station is connected to at least one of the core network of the first network or a core network of a second network; and sending, by the source base station, a first handover request to a mobility management function in the core network of the first network, wherein the first handover request is used for requesting the handover of the UE from a connection to the source base station to a connection to the target base station and indicating information about a core network of a target network accessed by the UE through the target base station after the handover.

Optionally, the first handover request carries information for indicating the core network of the target network.

Optionally, receiving, by the source base station, a handover preference type of the target network sent by the mobility management function, wherein the handover preference type is used for indicating the core network of the first network or the core network of the second network; and carrying, by the source base station according to the handover preference type, information about a core network of a target network for responding to the handover preference type in the first handover request.

Optionally, receiving, by the source base station, a second handover request sent by the mobility management function, wherein the second handover request is a request sent in a case where the mobility management function fails to determine, according to the first handover request, the core network of the target network accessed by the UE through the target base station after the handover; and sending, by the source base station to the mobility management function, response information sent in response to the second handover request, wherein the response information is used for indicating the core network of the target network.

Optionally, in a case where the core network of the first network is a core network of a 5G network, the core network of the second network is a core network of a 4G network; and in a case where the core network of the first network is the core network of the 4G network, the core network of the second network is the core network of the 5G network.

Optionally, in a case where the first network is a 4G network, the mobility management function is a mobility management entity (MME); and in a case where the first network is a 5G network, the mobility management function is an access and mobility control function (AMF).

Another embodiment of the present disclosure provides a network handover apparatus located in a mobility control function in a core network of a first network. The network handover apparatus includes a receiving module, which is configured to receive a first handover request sent by a source base station connected to the core network of the first network, wherein the first handover request is used for requesting a handover of a user equipment (UE) connected to the source base station from the source base station to a target base station, and the target base station is connected to at least one of the core network of the first network or a core network of a second network; a determination module, which is configured to determine, according to the first handover request, a core network of a target network accessed by the UE through the target base station after the handover, wherein the core network of the target network is the core network of the first network or the core network of the second network; and a handover module, which is configured to initiate, according to the core network of the target network, the handover of the UE between the source base station and the target base station.

Optionally, the handover module is further configured to: in response to the UE accessing the core network of the first network through the target base station, initiate an intra-system handover; and in response to the UE accessing the core network of the second network through the target base station, initiate an inter-system handover.

Optionally, the first handover request carries information for indicating the core network of the target network.

Optionally, the apparatus further includes a sending module, which is configured to send a handover preference type of the target network to the source base station, where the handover preference type is used for indicating the core network of the first network or the core network of the second network.

Optionally, the determination module includes: a first determination unit, which is configured to: in a case where the first handover request carries information for indicating the core network of the target network, determine that a core network accessed by the UE through the target base station after the handover is the core network of the target network; and a second determination unit, which is configured to: in a case where the first handover request does not carry information for indicating the core network of the target network, determine a core network accessed by the UE through the target base station after the handover is a core network indicated by the handover preference type.

Optionally, the determination module further includes: a sending unit, which is configured to: in a case where the core network of the target network accessed by the UE through the target base station after the handover fails to be determined according to the first handover request, send a second handover request to the source base station; a receiving unit, which is configured to receive response information sent in response to the second handover request by the source base station, where the response information is used for indicating the core network of the target network; and a third determination unit, which is configured to determine that a core network accessed by the UE through the target base station after the handover is the core network of the target network indicated by the response information.

Another embodiment of the present disclosure provides a network handover determination apparatus located in a source base station connected to a core network of a first network. The network handover determination apparatus includes a sending module, which is configured to receive a measurement report sent by a user equipment (UE) to determine a target base station to which a handover is to be performed, in which the target base station is connected to the core network of the first network and/or a core network of a second network; and a sending module, which is configured to send a first handover request to a mobility management function located in the core network of the first network, where the first handover request is used for requesting the handover of the UE from a connection to the source base station to a connection to the target base station and indicating information about a core network of a target network accessed by the UE after the handover.

Optionally, the first handover request carries information for indicating the core network of the target network.

Optionally, the apparatus further includes a first receiving module, which is configured to receive a handover preference type of the target network sent by the mobility management function, where the handover preference type is used for indicating the core network of the first network or the core network of the second network; and a configuration module, which is configured to carry, according to the handover preference type, information about a core network of a target network for responding to the handover preference type in the first handover request.

Optionally, the apparatus further includes: a second receiving module, which is configured to receive a second handover request sent by the mobility management function, where the second handover request is a request sent in a case where the mobility management function fails to determine, according to the first handover request, the core network of the target network accessed by the UE through the target base station after the handover; and an acquisition module, which is configured to send, to the mobility management function, response information sent in response to the second handover request, where the response information is used for indicating the core network of the target network.

Another embodiment of the present disclosure provides a network handover system. The network handover system includes: a source base station, a mobility management function, a user equipment (UE) and a target base station. The source base station is connected to a core network of a first network, the mobility management function is located in the core network of the first network, the UE is connected to the source base station, and the target base station is connected to the core network of the first network and/or a core network of a second network. The source base station is configured to receive a measurement report sent by the UE to determine a target base station to which a handover is to be performed, and send a first handover request to the mobility management function. The mobility management function is configured to receive the first handover request sent by the source base station; determine, according to the first handover request, a core network of a target network accessed by the UE through the target base station after the handover; and initiate the handover of the UE between the source base station and the target base station according to the core network of the target network. The core network of the target network is the core network of the first network or the core network of the second network.

Optionally, in a case where the core network of the first network is a core network of a 5G network, the core network of the second network is a core network of a 4G network. And, in a case where the core network of the first network is the core network of the 4G network, the core network of the second network is the core network of the 5G network.

Optionally, in a case where the first network is a 4G network, the mobility management function is a mobility management entity (MME); and in a case where the first network is a 5G network, the mobility management function is an access and mobility control function (AMF).

Another embodiment of the present disclosure provides a storage medium storing a computer program. When the computer program is executed, the steps in any above-mentioned embodiments are performed.

Another embodiment of the present disclosure provides an electronic apparatus. The electronic apparatus includes a memory with computer program stored thereon and a processor. The processor is configured to execute the computer program for performing the steps in any above-mentioned embodiments.

BRIEF DESCRIPTION OF DRAWINGS

The drawings described herein provide a further understanding of the present application and form a part of the present application. The exemplary embodiments and descriptions thereof in the present disclosure use to explain the present application and do not constitute improper limitation of the application. In the drawings.

DETAILED DESCRIPTION

Hereinafter, the present application will be described in detail with reference to drawings and in conjunction with embodiments. It is to be noted that if not in collision, the embodiments described herein and the features in the embodiments may be combined with each other.

It is to be noted that the terms "first", "second" and the like in the description, claims and drawings of the present application are used to distinguish between similar objects and are not used to describe a particular order or sequence.

Embodiment One

In the related art, in the architecture which supports bidirectional handover between networks, for a UE that can merely access one type of network after handover, the source network may be fail to determine to access which target network after the handover since the target base station connected to the UE can be connected to two different types of networks at the same time, and causing a failed network handover. For the above problem, no effective solution has been proposed yet in the related art.

The embodiments of the present disclosure provide a network handover method, apparatus and system, and a network handover determination method and apparatus, to at least solve the problem mentioned above, in the related art, of network handover failure caused by the fact that a source network fails to determine the target network accessed after handover since a target base station may be connected to two different types of networks at the same time.

In the present application, the mobility management function receives request information from a source base station connected to a core network of the same network as the mobility management function, and acquires, from the request information, information used for determining a target base station and a core network of a target network. Thus, the target network of the target base station to which a handover is to be performed and the UE is to be connected after the handover can be determined. Then, the handover of the UE between the source base station and the target base station is initiated. Therefore, in the present application, the problem in the related art that the source network may be fail to determine the network to be accessed after the handover since the target base station can be connected to two different types of networks at the same time can be solved, and the beneficial effects of effectively improving the handover efficiency in a handover process and reducing the network handover failure can be achieved.

Figure 1:
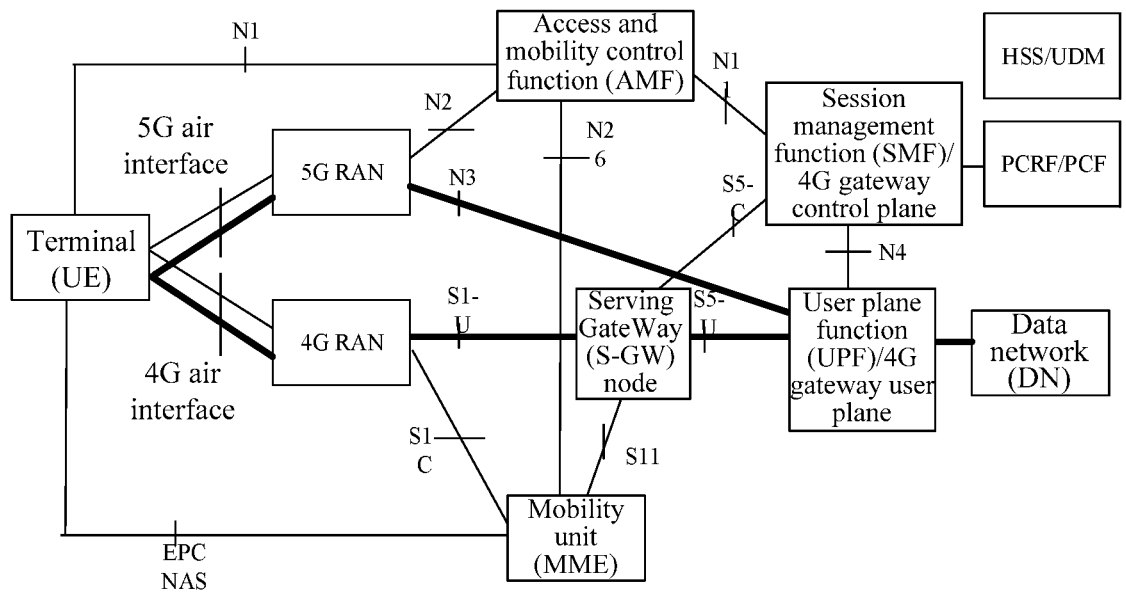
FIG. 1 is a network architecture diagram illustrating bidirectional handover of a user equipment between a 4G network and a 5G network in the related art.
Figure 2:
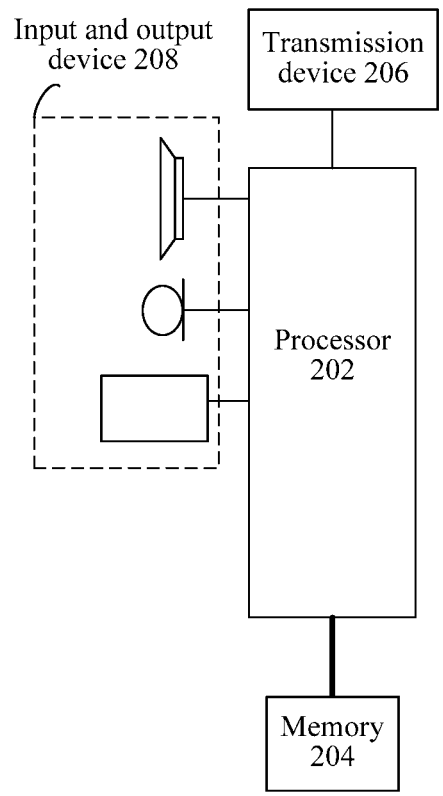
FIG. 2 is a hardware structure block diagram of a mobile terminal for a network handover method according to the embodiments of the present disclosure.

A method provided in the embodiment one of the present application may be executed in a mobile terminal, a computer terminal or other similar computing apparatuses. Taking the method to be executed in the mobile terminal as an example, FIG. 2 is a hardware structure block diagram illustrating a mobile terminal for a network handover method according to the embodiments of the present disclosure. As shown in FIG. 2, a mobile terminal may include one or more (merely shown one in FIG. 2) processors 202 and a memory 204 used to storing data. The processor 202 may include, but are not limited to, a processing apparatus such as a microcontroller unit (MCU) and a field programmable gate array (FPGA)). Optionally, the mobile terminal described above may also include a transmission device 206 configured to implement a communication function and an input and output device 208. It is to be understood by those skilled in the art that the structure shown in FIG. 2 is merely illustrative and not intended to limit the structure of the mobile terminal described above. For example, the mobile terminal may further include more or fewer components than the components shown in FIG. 2, or may have a configuration different from the configuration shown in FIG. 2.

The memory 204 may store a computer program, such as a software program and a module of application software. For example, the computer program stored in the memory 202 corresponds to a computer program of the network handover method in the embodiments of the present disclosure. The processor 202 executes the computer program stored in the memory 204 to perform various functional applications and data processing, that is, to implement the method described above. The memory 204 may include a high-speed random access memory, and may further include a nonvolatile memory such as one or more magnetic storage apparatuses, flash memories or other nonvolatile solid-state memories. In some examples, the memory 204 may further include memories that are disposed remote from the one or more processors 202. These remote memories may be connected to the mobile terminal via a network. Examples of the network described above include, but are not limited to, the Internet, an intranet, a local area network, a mobile communication network and a combination thereof.

The transmission device 206 is configured to receive or send data via a network. Specific examples of the network may include a wireless network provided by a communication provider of the mobile terminal. In an example, the transmission device 206 includes a network interface controller (NIC), which may be connected to other network devices via a base station, thereby communicating with the Internet. In an example, the transmission device 206 may be a radio frequency (RF) module communicating with the Internet in a wireless way.

Figure 3:
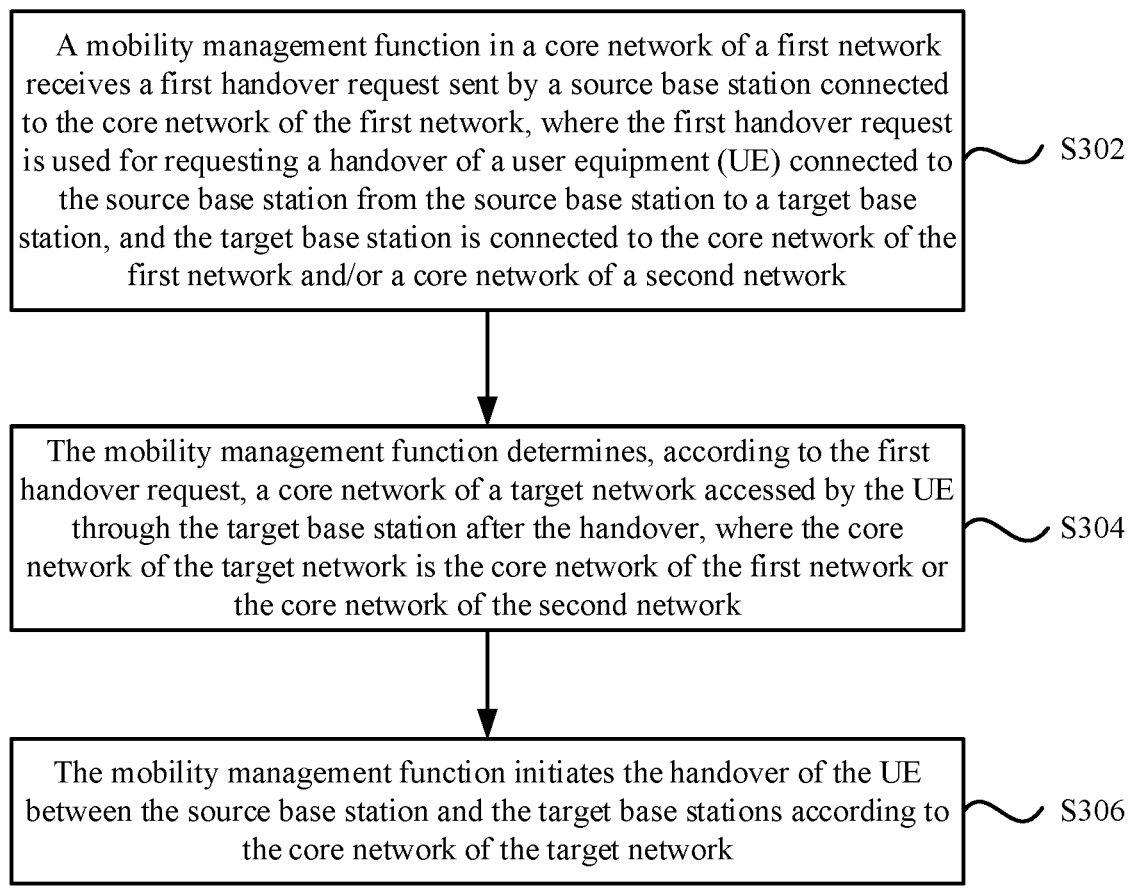
FIG. 3 is a flowchart of a network handover method according to the embodiments of the present disclosure.

The embodiment provides a network handover method executed on the mobile terminal described above. FIG. 3 is a flowchart of a network handover method according to the embodiments of the present disclosure. As shown in FIG. 3, the method includes steps described below.

In step S302, a mobility management function in a core network of a first network receives a first handover request sent by a source base station connected to the core network of the first network, where the first handover request is used for requesting a handover of a user equipment (UE) connected to the source base station from the source base station to a target base station, and the target base station is connected to the core network of the first network and/or a core network of a second network.

In step S304, the mobility management function determines, according to the first handover request, a core network of a target network accessed by the UE through the target base station after the handover, where the core network of the target network is the core network of the first network or the core network of the second network.

In step S306, the mobility management function initiates the handover of the UE between the source base station and the target base station according to the core network of the target network.

Optionally, when the core network of the first network is a core network of a 5G network, the core network of the second network is a core network of a 4G network. And, when the core network of the first network is a core network of a 4G network, the core network of the second network is a core network of a 5G network.

Optionally, when the first network is a 4G network, the mobility management function is a mobility management entity (MME); and when the first network is a 5G network, the mobility management function is an access and mobility control function (AMF).

It is to be noted that any network based on the concept of the embodiments of the present disclosure is within the protection scope of the present disclosure. Specifically, any different networks capable of being connected to the same base station are within the protection scope of the embodiments.

It is to be noted that merely one second network is listed in the embodiment. If multiple same or different second networks exist capable of being connected to the same target base station as the core network of the first network, the multiple same or different second networks are also within the protection scope of the embodiments of the present disclosure.

Optionally, in a case where the UE accesses the core network of the first network through the target base station, the mobility management function initiates an intra-system handover; and in a case where the UE accesses the core network of the second network through the target base station, the mobility management function initiates an inter-system handover.

Optionally, the first handover request carries information for indicating the core network of the target network.

For example, the first network is the 5G network, and the second network is the 4G network. If information about the core network of the 5G network is carried in the first handover request, the AMF can determine, after received this first handover request, that the core network accessed through the target base station after the UE is handed over to the target base station is the core network of the 5G network. At this time, the AMF initiates an intra-system handover from the core network of the 5G network accessed by the UE through the source base station to the core network of the 5G network accessed by the UE through the target base station. If information about the core network of the 4G network is carried in the first handover request, the AMF can determine, after received this first handover request, that the core network accessed through the target base station after the UE is handed over to the target base station is the core network of the 4G network. At this time, the AMF initiates an inter-system handover from the core network of the 5G network accessed by the UE through the source base station to the core network of the 4G network accessed by the UE through the target base station. Therefore, in the above-mentioned manner, the beneficial effects of effectively improving the handover efficiency in the handover process and reducing the network handover failure can be achieved.

Optionally, the mobility management function sends a handover preference type of the target network to the source base station, where the handover preference type is used for indicating the core network of the first network or the core network of the second network.

Optionally, in a case where the first handover request carries information for indicating the core network of the target network, the mobility management function determines that a core network accessed by the UE through the target base station after the handover is the core network of the target network.

Optionally, in a case where the first handover request does not carry information for indicating the core network of the target network, the mobility management function determines that a core network accessed by the UE through the target base station after the handover is a core network indicated by the handover preference type.

In particular, the mobility management function may notify the source base station in a variety of process, such as a registration process, a media plane establishment process, a modification process, or the handover process.

For example, the first network is the 4G network, and the second network is the 5G network. In the registration process, the MME sends the handover preference type to the source base station in advance, and recommends that the handover preference type of the core network of the target network accessed by the UE through the target base station after the handover is the core network of the 4G network. After receiving the handover preference type sent by the MME, the source base station can consider the recommended the core network of the 4G network in the handover preference type. If the source base station adopts the handover preference type recommended by the MME, the first handover request subsequently sent carries relevant information indicating that the UE accesses the core network of the 4G network after handover. After receiving the first handover request, the MME initiates an intra-system handover from the core network of the 4G network accessed by the UE through the source base station to the core network of the 4G network accessed by the UE through the target base station. If the handover preference type recommended by the MME is not adopted and the UE is expected to access the core network of the 5G network through the target base station after handover, the first handover request subsequently sent carries relevant information indicating that the UE accesses the core network of the 5G network after handover. At this time, after receiving the handover request, the MME initiates an inter-system handover from the core network of the 4G network accessed by the UE through the source base station to the core network of the 5G network accessed by the UE through the target base station, i.e., the UE accesses the core network of the 5G network through the target base station. And, if the first handover request does not carry a response to the handover preference type or any indication of connection to a core network of a network, the MME will initiate, according to the 4G network recommended in the handover preference type, an intra-system handover from the core network of the 4G network accessed by the UE through the source base station to the core network of the 4G network accessed by the UE through the target base station.

Optionally, in a case where the mobility management function fails to determine, according to the first handover request, the core network of the target network accessed by the UE through the target base station after the handover, the mobility management function sends a second handover request to the source base station; the mobility management function receives response information sent in response to the second handover request by the source base station. The response information is used for indicating the core network of the target network; and the mobility management function determines that a core network accessed by the UE through the target base station after the handover is the core network of the target network indicated by the response information.

It is to be noted that, the cases of the mobility management function failing to determine, according to the first handover request, the core network of the target network accessed by the UE through the target base station after the handover may include but not limited to: the mobility management function failing to interpret information about the relevant information for indicating the core network of the target network sent by the source base station; or the information for indicating the core network of the target network received by the mobility management function being damaged.

For example, the first network is the 5G network, and the second network is the 4G network. After receiving the first handover request sent by the source base station, the mobility management function finds that the information for indicating the core network of the target network in the handover request sent by the source base station is incomplete, and the AMF cannot confirm whether the core network of the 4G network or the core network of the 5G network is to be accessed by the UE through the target base station after handover. Therefore, the AMF sends a second handover request to the source base station for requesting the source base station to determine whether the core network of the 4G network or the core network of the 5G network is to be accessed by the UE through the target base station after handover. After receiving the second handover request, the source base station feeds back information about 5G network in the response to the AMF. According to the information about the 5G network in the response, the AMF then initiates an intra-system handover from the core network of the 5G network accessed by the UE through the source base station to the core network of the 5G network accessed by the UE through the target base station.

Optionally, in this embodiment, a specific intra-system handover process and a specific inter-system handover process are also provided.

Figure 4:
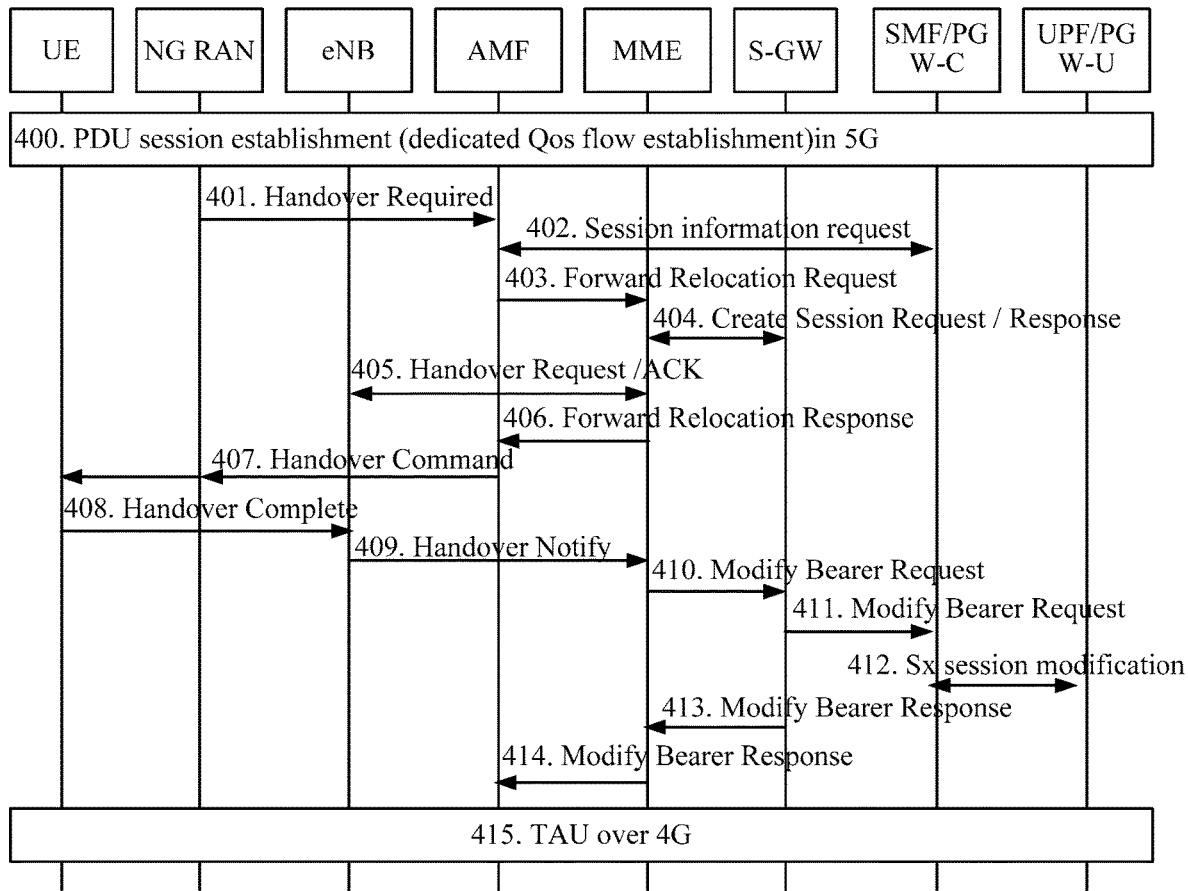
FIG. 4 is a flowchart illustrating a handover of a user equipment from a 5G network to a 4G network according to the embodiments of the present disclosure.

FIG. 4 is a flowchart illustrating a handover of user equipment from a 5G network to a 4G network according to the embodiments of the present disclosure. See FIG. 4.

In step 400, a UE has established a PDU session and may have established a dedicated Qos flow in the 5G system.

In step 401, a source 5G RAN node finds itself needs to be handed over to 4G, and sends a handover required message carrying information about a target cell to an AMF.

In step 402, the AMF requests session information corresponding to the 4G from an SMF.

In step 403, the AMF selects a target MME and sends a Forward relocation Request.

In step 404, the MME sends a create session request to an S-GW.

In step 405, the MME sends a handover request to an eNB for radio resources.

In step 406, after receiving a response from the eNB, the MME sends a Forward Relocation Response to the AMF.

In step 407, the AMF sends a Handover Command to the 5G RAN node, and the 5G RAN node sends the Handover Command to the UE.

In step 408, the UE accesses the 4G system and sends a Handover complete message to the eNB.

In step 409, the eNB sends a handover notify to the MME.

In steps 410 to 414, MME initiates a modify bearer request to the S-GW and then the S-GW sends the request to a P-GW, and finally a media plane is established.

In step 415, the UE performs a tracking area update (TAU) process in the 4G system.

It is to be noted that a flow of a handover from the 4G network to the 5G network is also within the protection scope of the present application. For example, in the above steps, functions of the source 5G RAN node and the 4G RAN node, and functions of the AMF and the MME may be interchanged. Details are not described herein.

Figure 5:
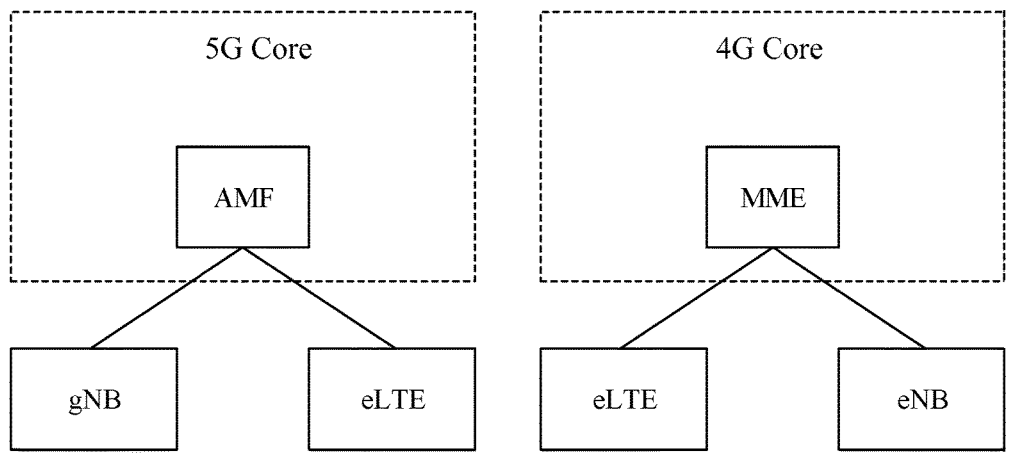
FIG. 5 is a structure diagram illustrating various types of base stations accessing 4G and 5G networks, respectively, according to the embodiments of the present disclosure.

FIG. 5 is a structure diagram illustrating various types of base stations accessing 4G and 5G networks, respectively, according to the embodiments of the present disclosure.

Figure 6:
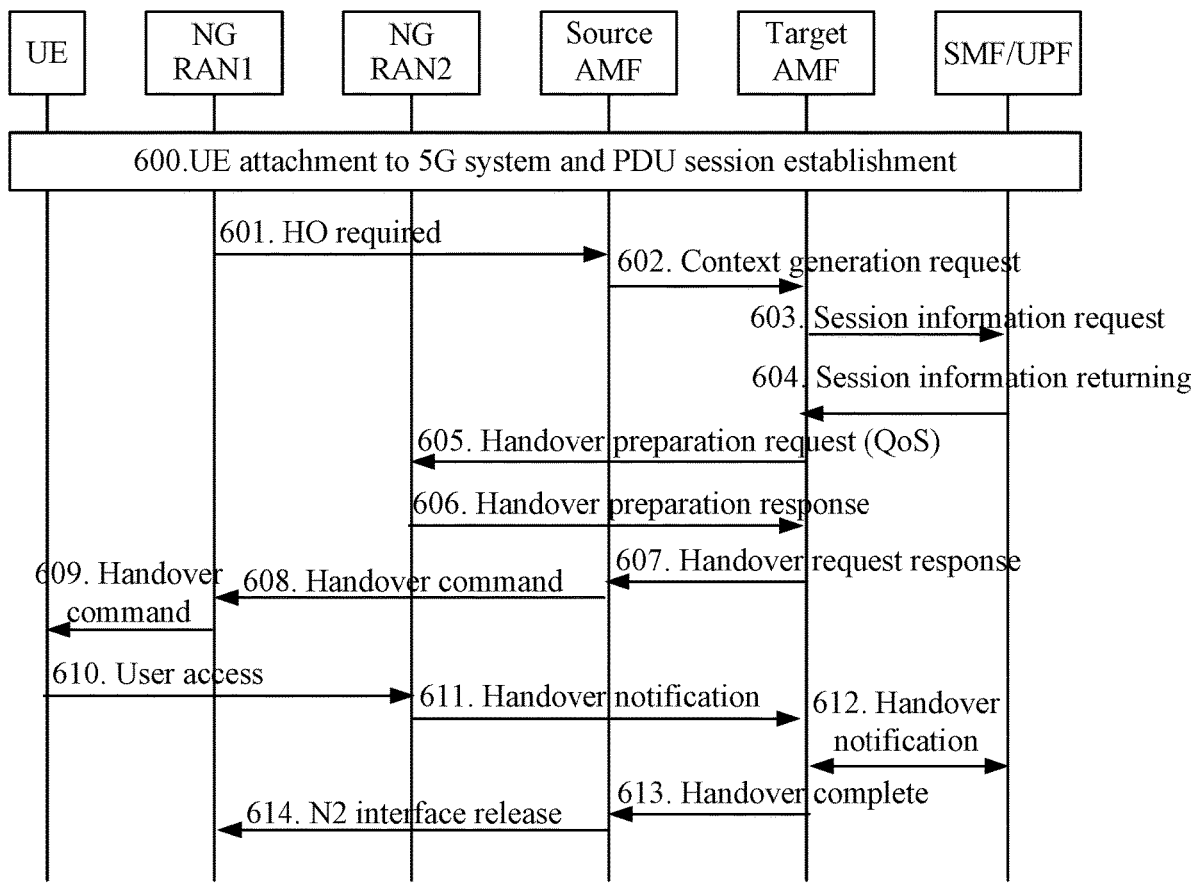
FIG. 6 is a flowchart of an intra-system handover between 5G systems according to the embodiments of the present disclosure.

FIG. 6 is a flowchart of an intra-system handover between 5G systems according to the embodiments of the present disclosure. See FIG. 6.

In step 600, a UE is attached to the 5G system and one or more PDU sessions are established.

In step 601, an NG RAN1 determines to initiate a handover, and determines a target base station 2 of the handover according to a measurement report from the UE. The NG RAN1 initiates a handover request to a source AMF, where the request carries information about a target base station and current session information.

In step 602, the source AMF selects a target AMF according to the information about the target base station, and then sends a context generation request to the target AMF, where the request carries the information about the target base station and the current session information, and the current session information includes an SMF address and PDU session information.

In step 603, the target AMF sends a PDU session handover request to the SMF according to the SMF information.

In step 604, the SMF returns the PDU session information such as QoS.

In step 605, the target AMF requests a resource reservation from a target NG RAN2 according to the PDU session information.

In step 606, the NG RAN2 reserves radio resources according to the PDU session information and returns a handover request response message which carries information about the reserved radio resource. The message also carries an N3 tunnel downlink tunnel identifier that is allocated by the target NG RAN2 to a PDU session for which a resource is successfully reserved.

In step 607, the target AMF returns a handover preparation response to the source AMF, where the message carries the radio resource information reserved by the target base station for the PDU session.

In step 608, after determining that a resource is successfully reserved for a PDU session, the source AMF returns a handover request response message to the RAN1, where the radio resource information reserved by the target RAN2 for PDU sessions is carried.

In step 609, the NG RAN1 initiates a handover command to the UE, where the radio resource information reserved by the RAN2 is carried.

In step 610, the UE accesses the NG RAN2 according to the radio resource information reserved by the NG RAN2.

In step 611, the NG RAN2 initiates a handover notification message to the target AMF.

In step 612, the target AMF initiates a handover notification to the SMF, where the N3 tunnel downlink tunnel identifier allocated by the target RAN2 for each session is carried. The SMF and the UPF interactively update the N3 tunnel downlink tunnel identifier, and then return a path handover response to the target AMF.

In step 613, the target AMF returns a handover complete message to the source AMF.

In step 614, the source AMF sends an N2 interface release request to the source RAN1.

When multiple PDU sessions exist, the steps 603, 604 and 612 may be performed once according to each PDU session.

A change in AMF occurs during the 5G intra-system handover process in the FIG. 6. A 5G intra-system handover process in which no change in AMF occurs is equivalent to a flow in which the source AMF and the target AMF are combined, and the signaling interaction between the source AMF and the target AMF is deleted from the figure. Details are not described here again.

It is to be noted that a handover between 4G networks is also within the protection scope of the embodiment, in which the functions of the source AMF and the target AMF may be implemented by the source MME and the target MME. Details are not described herein.

Optionally, two types of base stations in the 5G system exist. One type is a new radio access technology (New RAT) base station (gNB) and the another type is an evolved LTE technology base station (eLTE). At this time, the handover of the UE from the gNB to the eLTE connected to the 5G core network is an intra-system handover in 5G system.

Optionally, two types of base stations in the 4G system exist, and may be a conventional eNB base station or an evolved LTE technology base station (eLTE). At this time, the handover of the UE from the eNB to the eLTE connected to the 4G core network is an intra-system handover in 4G system.

A handover between the gNB or the eLTE connected to the 5G core network and the eLTE connected to the 4G core network or the eNB is an inter-system handover.

Through the above steps of the present disclosure, the problem in the related art that the source network fail to determine the network accessed after the handover since the target base station can be connected to two different types of networks at the same time can be solved, and the beneficial effects of effectively improving the handover efficiency in a handover process and reducing the network handover failure can be achieved.

From the description of the above implementations, it will be apparent to those skilled in the art that the method according to the embodiments may be implemented by software and a necessary general-purpose hardware platform, or may, of course, be implemented by hardware. However, in many cases, the former is a preferred implementation. Based on this understanding, the solution provided by the present application substantially, or the part contributing to the existing art, may be embodied in the form of a software product. The computer software product is stored on a storage medium (such as a ROM/RAM, a magnetic disk or an optical disk) and includes several instructions for enabling a terminal device (which may be a mobile phone, a computer, a server or a network device) to execute the method according to the embodiments of the present application.

Embodiment Two

Figure 7:
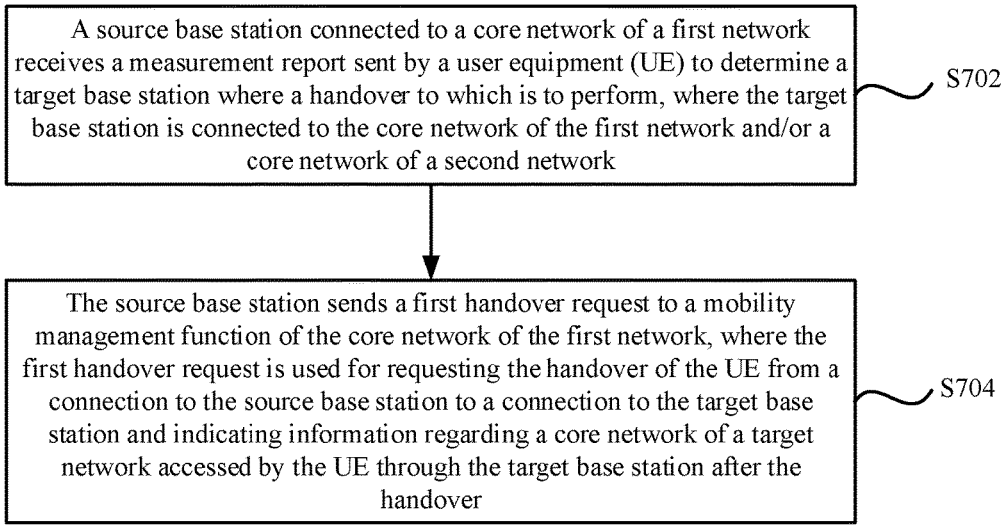
FIG. 7 is a flowchart of a network handover determination method according to the embodiments of the present disclosure.

The embodiment provides a network handover determination method executed on the mobile terminal as shown in FIG. 2. FIG. 7 is a flowchart of a network handover determination method according to the embodiments of the present disclosure. As shown in FIG. 7, the method includes steps described below.

In step 702, a source base station connected to a core network of a first network receives a measurement report sent by a user equipment (UE) to determine a target base station to which a handover is to be performed, where the target base station is connected to the core network of the first network and/or a core network of a second network.

In step 704, the source base station sends a first handover request to a mobility management function in the core network of the first network, where the first handover request is used for requesting the handover of the UE from a connection to the source base station to a connection to the target base station and indicating information about a core network of a target network accessed by the UE through the target base station after the handover.

Optionally, in a case where the core network of the first network is a core network of a 5G network, the core network of the second network is a core network of a 4G network; and in a case where the core network of the first network is a core network of a 4G network, the core network of the second network is a core network of a 5G network.

Optionally, in a case where the first network is a 4G network, the mobility management function is a mobility management entity (MME); and in a case where the first network is a 5G network, the mobility management function is an access and mobility control function (AMF).

It is to be noted that any network based on the concept of the embodiments of the present disclosure is within the protection scope of the present disclosure. Specifically, any different networks capable of being connected to the same base station are within the protection scope of the embodiments.

It is to be noted that merely one second network is listed in the embodiment. If multiple same or different second networks exist capable of being connected to the same target base station as the core network of the first network, the multiple same or different second networks are also within the protection scope of the embodiments of the present disclosure.

Optionally, the first handover request carries information for indicating the core network of the target network.

Optionally, the source base station receives a handover preference type of the target network sent by the mobility management function, where the handover preference type is used for indicating the core network of the first network or the core network of the second network; and the source base station carries, according to the handover preference type, information about a core network of a target network for responding to the handover preference type in the first handover request.

Optionally, the source base station receives a second handover request sent by the mobility management function, where the second handover request is a request sent in a case where the mobility management function fails to determine, according to the first handover request, the core network of the target network accessed by the UE through the target base station after the handover; and the source base station sends, to the mobility management function, response information sent in response to the second handover request, where the response information is used for indicating the core network of the target network.

Through the above steps of the present disclosure, the problem in the related art that the source network may be fail to determine the network accessed after the handover since the target base station can be connected to two different types of networks at the same time can be solved, and the beneficial effects of effectively improving the handover efficiency in a handover process and reducing the network handover failure can be achieved.

From the description of the above-mentioned implementations, it will be apparent to those skilled in the art that the method in the embodiments may be implemented by software and a necessary general-purpose hardware platform, or may, of course, be implemented by hardware. However, in many cases, the former is a preferred implementation. Based on this understanding, the solution provided by the present application substantially, or the part contributing to the existing art, may be embodied in the form of a software product. The computer software product is stored on a storage medium (such as a ROM/RAM, a magnetic disk or an optical disk) and includes several instructions for enabling a terminal device (which may be a mobile phone, a computer, a server or a network device) to execute the method according to each embodiment of the present disclosure.

Specifically, based on the above disclosure, the embodiments of the present disclosure further provide scenarios below for understanding the technical solutions described in the embodiments.

Scenario One

Figure 8:
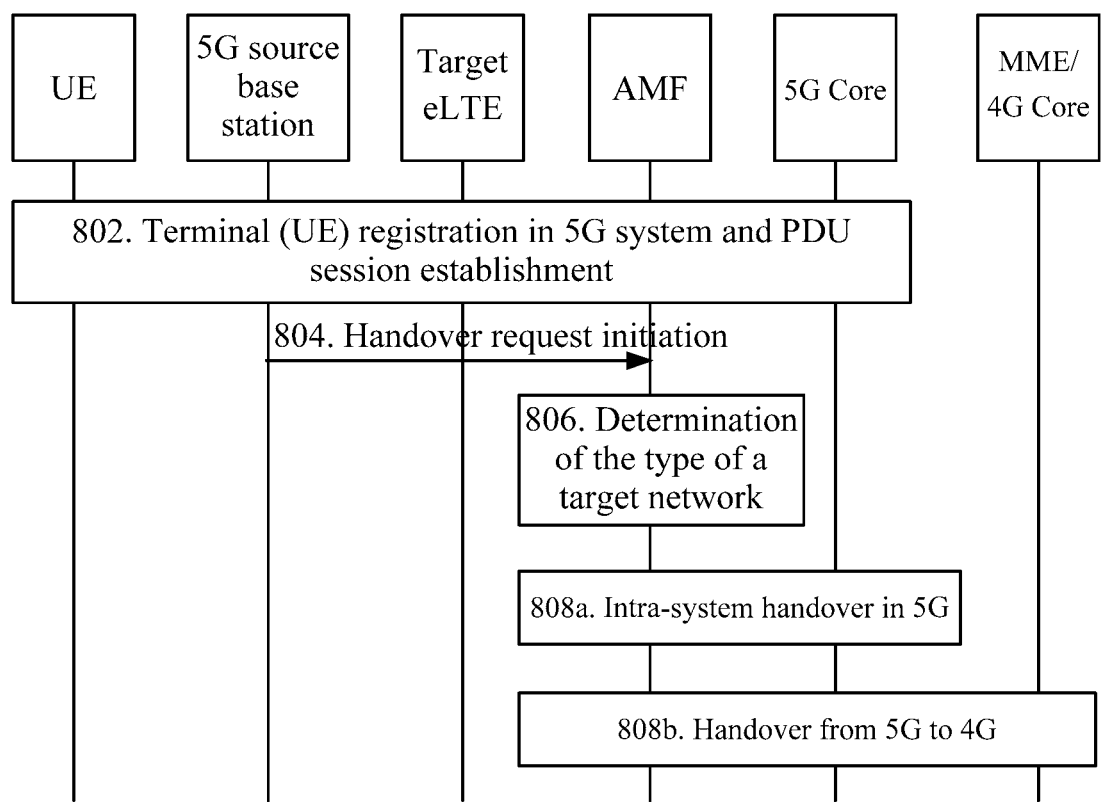
FIG. 8 is a flowchart for scenario one according to the embodiments of the present disclosure.

FIG. 8 is a flowchart of scenario one according to the embodiments of the present disclosure. See FIG. 8.

In step 802, a UE registers in the 5G system and a PDU session is established.

In step 804, a 5G source base station determines to initiate a handover, and determines a target eLTE base station of the handover according to a measurement report from the UE. An NG RAN1 initiates a handover request carrying information about a target core network to an AMF.

In step 806, the AMF determines the type of the target network and performs one of the operations described below.

In step 808a, in a case where the target network is a 5G network, the AMF initiates an intra-system handover process in 5G system; or In step 808b, in a case where the target network is a 4G network, the AMF initiates an inter-system handover process from a 5G system to a 4G system.

Scenario Two

Figure 9:
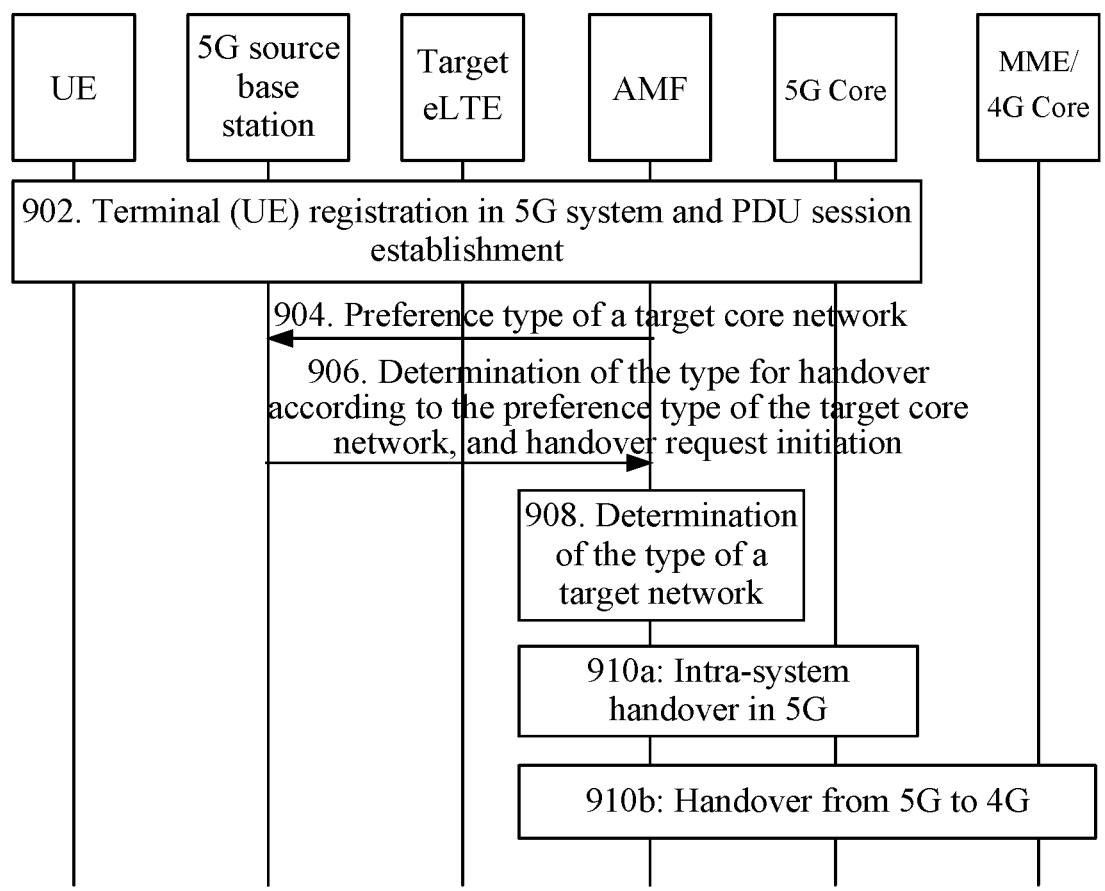
FIG. 9 is a flowchart for scenario two according to the embodiments of the present disclosure.

FIG. 9 is a flowchart of scenario two according to the embodiments of the present disclosure. See FIG. 9.

In step 902, a UE registers in the 5G system.

In step 904, an AMF sends a handover preference type of a target core network, such as a 4G core network or a 5G core network, to a 5G source base station. The AMF may notify the 5G base station in a variety of processes, e.g., notifying the source base station in a registration process, media plane establishment and modification processes, or a handover process.

In step 906, the 5G source base station determines to initiate a handover request. A target eLTE base station to which the handover is to be performed is determined according to a measurement report from the UE. When the eLTE base station is connected to a 4G core network and a 5G core network at the same time, the 5G source base station determines the type of handover according to the indication received in step 1004.

In step 908, the AMF determines the type of a target network. In a case where an indication for the target core network is carried in step 1006, the AMF performs one of the operations described below (910a or 910b). In a case where an indication for the target core network is not carried in step 1006, the AMF determines the type of the target core network according to the handover preference type of a target core network sent to the 5G source base station, and performs one of the operations described below.

In step 910a, in a case where the target network is a 5G network, the AMF initiates an intra-system handover process in 5G system; or In step 910b, in a case where the target network is a 4G network, the AMF initiates an inter-system handover process from 5G to 4G.

Scenario Three

Figure 10:
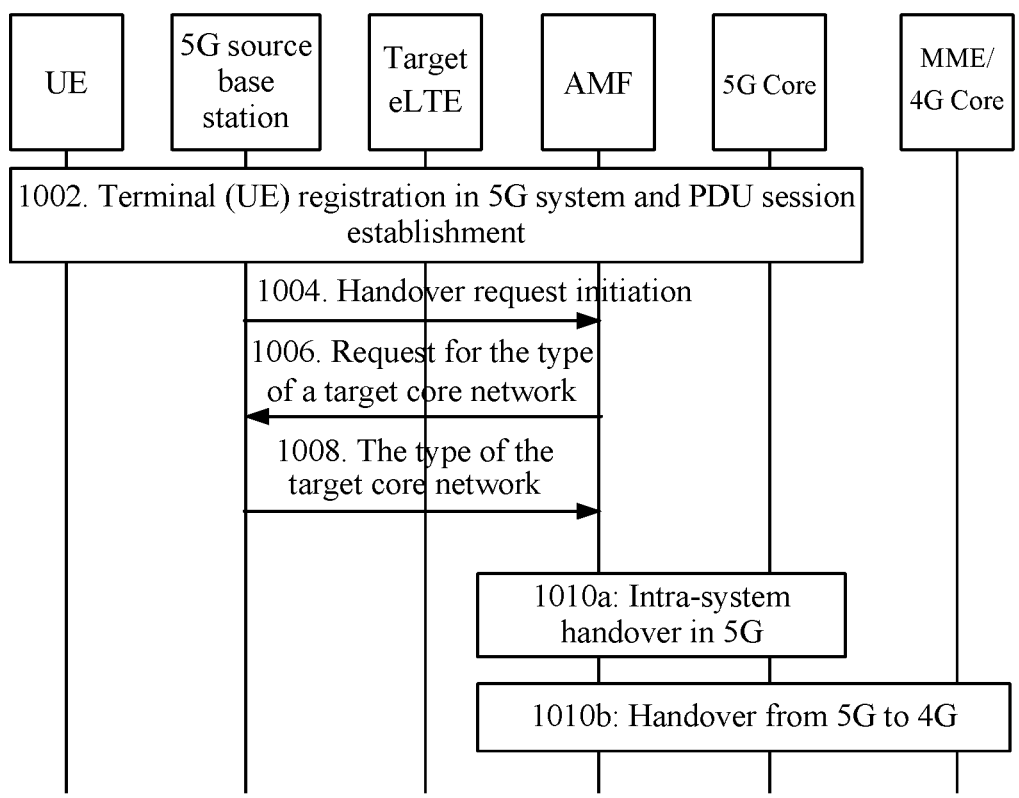
FIG. 10 is a flowchart for scenario three according to the embodiments of the present disclosure.

FIG. 10 is a flowchart of scenario three according to the embodiments of the present disclosure. See FIG. 10.

In step 1002, a UE registers in a 5G system and a PDU session is established.

In step 1004, a 5G source base station determines to initiate a handover, and determines a target eLTE base station of the handover according to a measurement report from the UE. The 5G source base station initiates a handover request to an AMF.

In step 1006, a target base station is connected to a 4G core network and a 5G core network at the same time, and the AMF fails to determine the type of the handover. The AMF requests from the 5G source base station a target network of the handover.

In step 1008, the 5G source base station returns the type of the target network to the AMF.

After reception, the AMF performs one of the following operations according to the type of the target network of the handover.

In step 1010a, in a case where the target network is a 5G network, the AMF initiates an intra-system handover process in 5G; or In step 1010b, in a case where the target network is a 4G network, the AMF initiates an inter-system handover process from 5G to 4G.

Scenario Four

Figure 11:
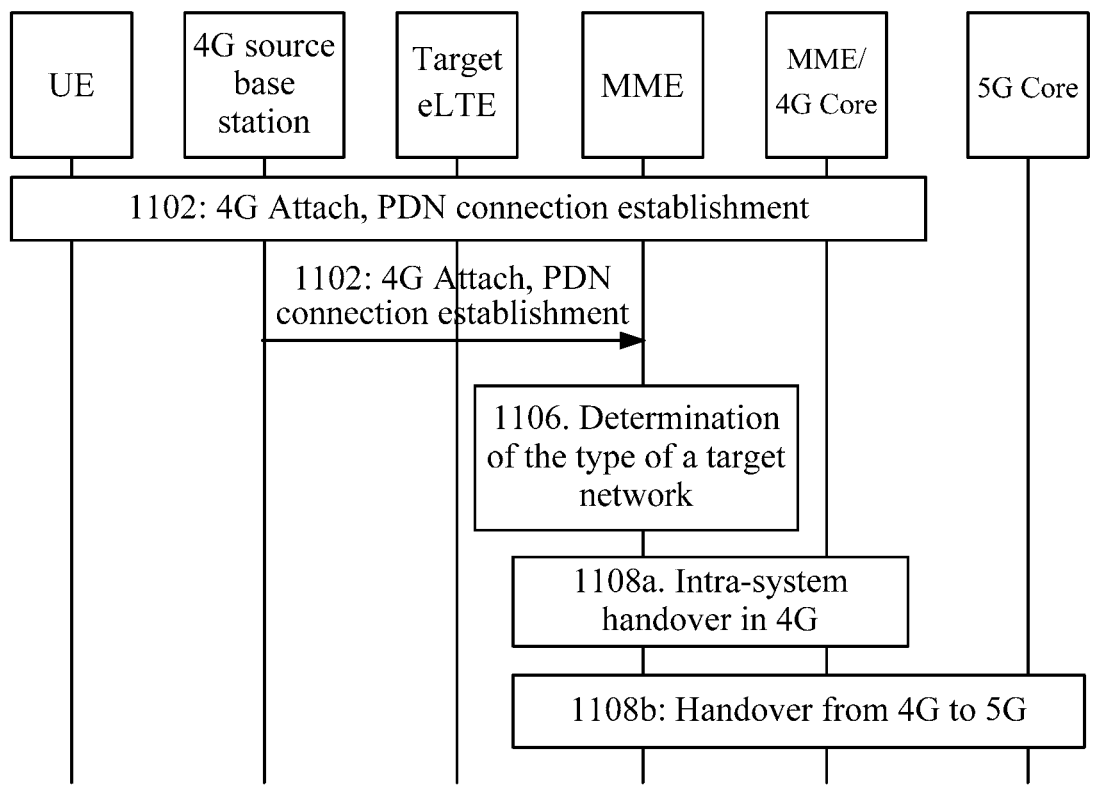
FIG. 11 is a flowchart for scenario four according to the embodiments of the present disclosure.

FIG. 11 is a flowchart of scenario four according to the embodiments of the present disclosure. See FIG. 11.

In step 1102, a UE is attached in a 4G system and a PDN connection is established.

In step 1104, a 4G source base station determines to initiate a handover, and determines a target eLTE base station of the handover according to a measurement report from the UE. The 4G source base station initiates a handover request to a MME, where a message carries information about a target core network.

In step 1106, the MME determines the type of the target network and performs one of the operations described below.

In step 1108a, in a case where the target network is a 4G network, the MME initiates an intra-system handover process in 4G; or In step 1108b, in a case where the target network is a 5G network, the MME initiates an inter-system handover process from 4G to 5G.

Scenario Five

Figure 12:
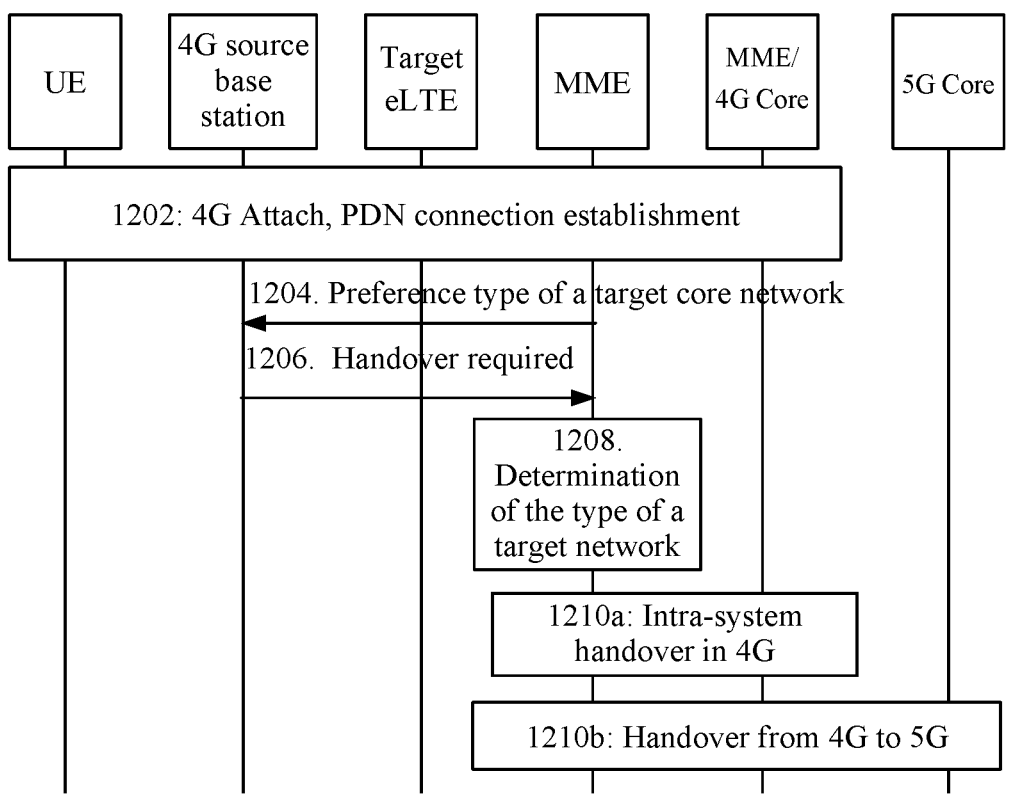
FIG. 12 is a flowchart for scenario five according to the embodiments of the present disclosure.

FIG. 12 is a flowchart of scenario five according to the embodiments of the present disclosure. See FIG. 12.

In step 1202, a UE is attached in a 4G system and a PDN connection is established.

In step 1204, an MME sends a handover preference type of a target core network, such as a 4G core network or a 5G core network, to a 4G base station. The MME may notify the 4G base station in a variety of processes, e.g., notifying the base station in an attachment process, a TAU process, media plane establishment and modification processes, or a handover process.

In step 1206, the 4G source base station determines to initiate a handover request. A target eLTE base station is determined according to a measurement report from the UE, where the target eLTE base station is a base station to which the handover is to be performed. In a case where the eLTE base station is connected to a 4G core network and a 5G core network at the same time, the 4G source base station determines the type of handover according to the indication received in step 1304.

In step 1208, in a case where an indication for the target core network is carried in step 1306, the MME determines the type of the target network and performs one of the operations described below (1210a or 1210b). In a case where an indication for the target core network is not carried in step 1306, the MME determines the type of the target core network according to the handover preference type of a target core network sent to the 4G source base station, and performs one of the operations described below.

In step 1210a, in a case where the target network is a 4G network, the MME initiates an intra-system handover process in 4G; or In step 1210b, in a case where the target network is a 5G network, the MME initiates an inter-system handover process from 4G to 5G.

Scenario Six

Figure 13:
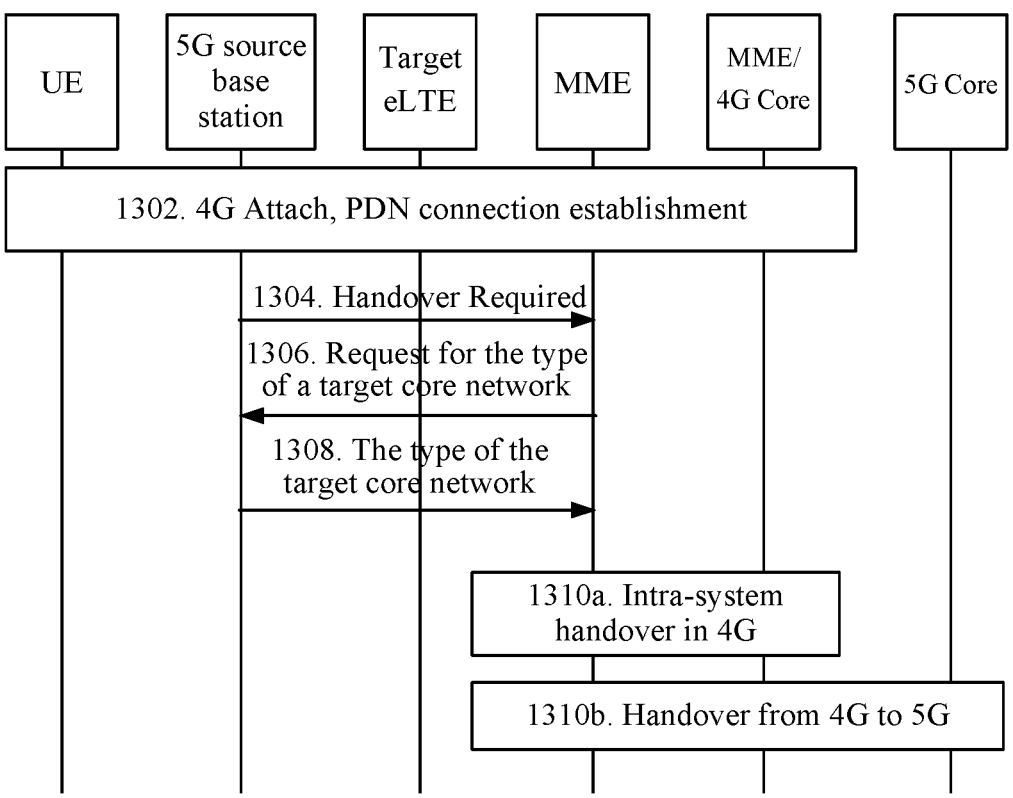
FIG. 13 is a flowchart for scenario six according to the embodiments of the present disclosure.

FIG. 13 is a flowchart of scenario six according to the embodiments of the present disclosure. See FIG. 13.

In step 1302, a UE is attached in a 4G system and a PDN connection is established.

In step 1304, a 4G source base station determines to initiate a handover, and determines a target eLTE base station of the handover according to a measurement report from the UE. The 4G source base station initiates a handover request to an MME.

In step 1306, the MME fails to determine a handover type since the target base station is connected to a 4G core network and a 5G core network at the same time. The MME requests a target network of the handover from the 4G source base station.

In step 1308, the 4G source base station returns the type of the target network to the MME.

After reception, the MME performs one of the following operations according to the type of the target network of the handover.

In step 1310a, in a case where the target network is a 4G network, the MME initiates an intra-system handover process in 4G; or In step 1310b, in a case where the target network is a 5G network, the MME initiates an inter-system handover process from 4G to 4G.

Embodiment Three

A network handover apparatus is provided in the embodiment. The apparatus is configured to implement the above-mentioned embodiments and preferred implementations, and what is described above will not be repeated here. The term of "module" used below may be software, hardware or a combination thereof and capable of implementing predetermined functions. The apparatuses in the embodiments described below are preferably implemented by software, but implementation by hardware or by a combination of software and hardware is also possible and conceived.

Figure 14:
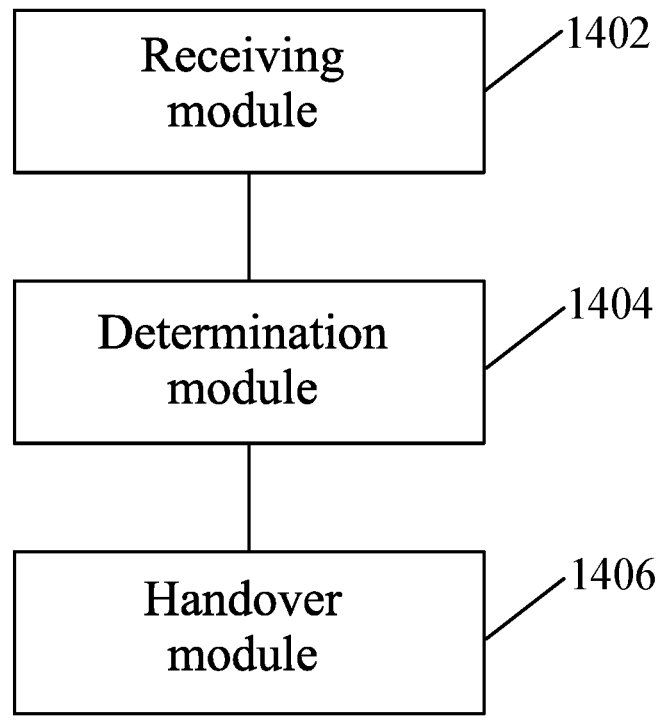
FIG. 14 is a structure diagram of a network handover apparatus according to the embodiments of the present disclosure.

FIG. 14 is a structure diagram of a network handover apparatus according to the embodiments of the present disclosure. As shown in FIG. 14, the apparatus includes a receiving module 1402, a determination module 1404 and a handover module 1406.

The receiving module 1402 is configured to receive a first handover request sent by a source base station connected to a core network of a first network, where the first handover request is used for requesting a handover of a user equipment (UE) connected to a source base station from the source base station to a target base station, and the target base station is connected to the core network of the first network and/or a core network of a second network.

The determination module 1404 is configured to determine, according to the first handover request, a core network of a target network accessed by the UE through the target base station after the handover, where the core network of the target network is the core network of the first network or the core network of the second network.

The handover module 1406 is configured to initiate the handover of the UE between the source base station and the target base station according to the core network of the target network.

Optionally, in a case where the core network of the first network is a core network of a 5G network, the core network of the second network is a core network of a 4G network; and in a case where the core network of the first network is the core network of the 4G network, the core network of the second network is the core network of the 5G network.

Optionally, the handover module 1406 is further configured to: in response to the UE accessing the core network of the first network through the target base station, initiate an intra-system handover; and in response to the UE accessing the core network of the second network through the target base station, initiate an inter-system handover.

Optionally, the first handover request carries information for indicating the core network of the target network.

Optionally, the apparatus further includes a sending module configured to send a handover preference type of the target network to the source base station, where the handover preference type is used for indicating the core network of the first network or the core network of the second network.

Optionally, the determination module includes: a first determination unit, which is configured to: in a case where the first handover request carries information for indicating the core network of the target network, determine that a core network accessed by the UE through the target base station after the handover is the core network of the target network; and a second determination unit, which is configured to: in a case where the first handover request does not carry information for indicating the core network of the target network, determine a core network accessed by the UE through the target base station after the handover is a core network indicated by the handover preference type.

Optionally, the determination module further includes: a sending unit, which is configured to: in a case where the core network of the target network accessed by the UE through the target base station after the handover fails to be determined according to the first handover request, send a second handover request to the source base station; a receiving unit, which is configured to receive response information sent in response to the second handover request by the source base station, where the response information is used for indicating the core network of the target network; and a third determination unit, which is configured to determine that a core network accessed by the UE through the target base station after the handover is the core network of the target network indicated by the response information.

It is to be noted that each module described above may be implemented by software or hardware. Implementation by hardware may, but may not necessarily, be performed in the following manners: the modules described above are located in the same processor, or the various modules described above are located in their respective processors in any combination form.

Embodiment Four

A network handover determination apparatus is provided in this embodiment. The apparatus is configured to implement the above-mentioned embodiments and preferred implementations, and what is described above will not be repeated here. The term of "module" used below may be software, hardware or a combination thereof and capable of implementing predetermined functions. The apparatuses in the embodiments described below are preferably implemented by software, but implementation by hardware or by a combination of software and hardware is also possible and conceived.

Figure 15:
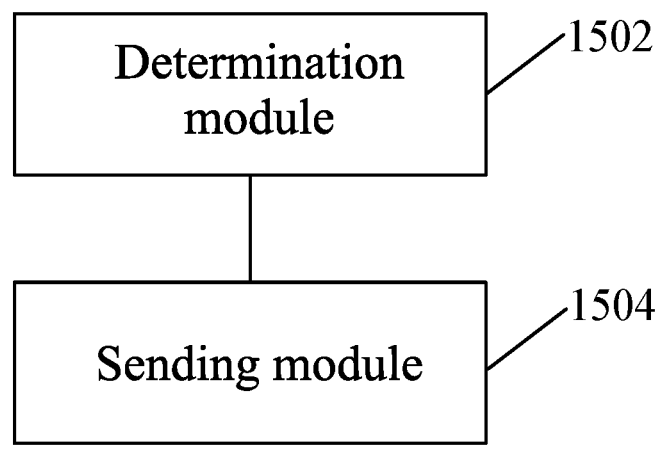
FIG. 15 is a structure diagram of a network handover determination apparatus according to the embodiments of the present disclosure.

FIG. 15 is a structure diagram of a network handover determination apparatus according to the embodiments of the present disclosure. As shown in FIG. 15, the apparatus includes a determination module 1502 and a sending module 1504.

The determination module 1502 is configured to receive a measurement report sent by a user equipment (UE) to determine a target base station to which a handover is to be performed, where the target base station is connected to the core network of the first network and/or a core network of a second network.

The sending module 1504 is configured to send a first handover request to a mobility management function located in the core network of the first network, where the first handover request is used for requesting the handover of the UE from a connection to the source base station to a connection to the target base station and indicating information about a core network of a target network accessed by the UE after the handover.

Optionally, the first handover request carries information for indicating the core network of the target network.

Optionally, the apparatus further includes a first receiving module, which is configured to receive a handover preference type of the target network sent by the mobility management function, where the handover preference type is used for indicating the core network of the first network or the core network of the second network; and a configuration module, which is configured to carry, according to the handover preference type, information about a core network of a target network for responding to the handover preference type in the first handover request.

Optionally, the apparatus further includes: a second receiving module, which is configured to receive a second handover request sent by the mobility management function, where the second handover request is a request sent in a case where the mobility management function fails to determine, according to the first handover request, the core network of the target network accessed by the UE through the target base station after the handover; and an acquisition module, which is configured to send, to the mobility management function, response information sent in response to the second handover request, where the response information is used for indicating the core network of the target network.

Embodiment Five

A network handover system is provided in this embodiment. The system is configured to implement the above-mentioned embodiments and preferred implementations, and what has been described will not be repeated here.

Figure 16:
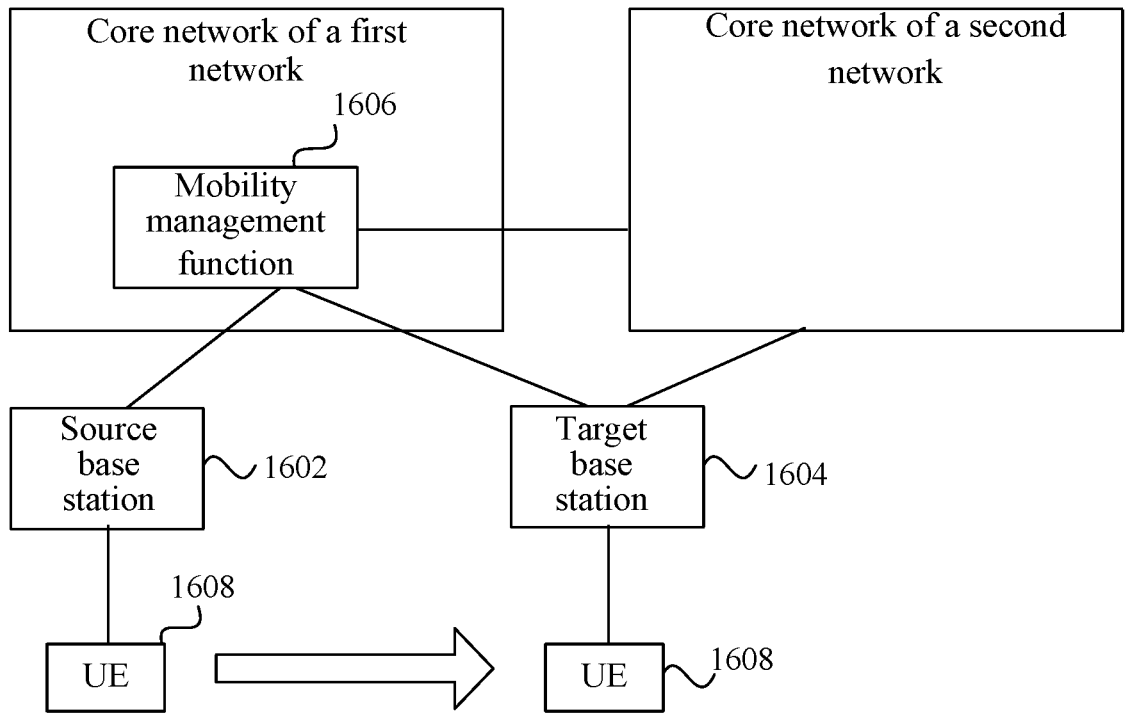
FIG. 16 is a structure diagram of a network handover system according to the embodiments of the present disclosure.

FIG. 16 is a structure diagram of a network handover system according to the embodiments of the present disclosure. As shown in FIG. 16, the system includes a source base station 1602, a target base station 1604, a mobility management function 1606, and a UE 1608. The source base station 1602 is connected to a core network of a first network, the mobility management function 1606 is located in the core network of the first network, the UE 1608 accesses the network through the source base station 1602, and the target base station 1604 is connected to at least one of the core network of the first network or a core network of a second network.

The source base station 1602 is configured to receive a measurement report sent by the UE 1608 to determine a target base station 1604 to which a handover is to be performed, and send a first handover request to the mobility management function 1606.

The target base station 1604 is connected to the core network of the first network and/or the core network of the second network.

The mobility management function 1606, located in the core network of the first network, is configured to receive a first handover request sent by the source base station 1602; determine, according to the first handover request, a core network of a target network accessed by the UE 1608 through the target base station 1604 after the handover, and initiate, according to the core network of the target network, the handover of the UE 1608 between the source base station 1602 and the target base station 1604. The core network of the target network is the core network of the first network or the core network of the second network.

Optionally, in a case where the core network of the first network is a core network of a 5G network, the core network of the second network is a core network of a 4G network; and in a case where the core network of the first network is a core network of a 4G network, the core network of the second network is a core network of a 5G network.

Optionally, in a case where the first network is a 4G network, the mobility management function is a mobility management entity (MME); and in a case where the first network is a 5G network, the mobility management function is an access and mobility control function (AMF).

Figure 17:
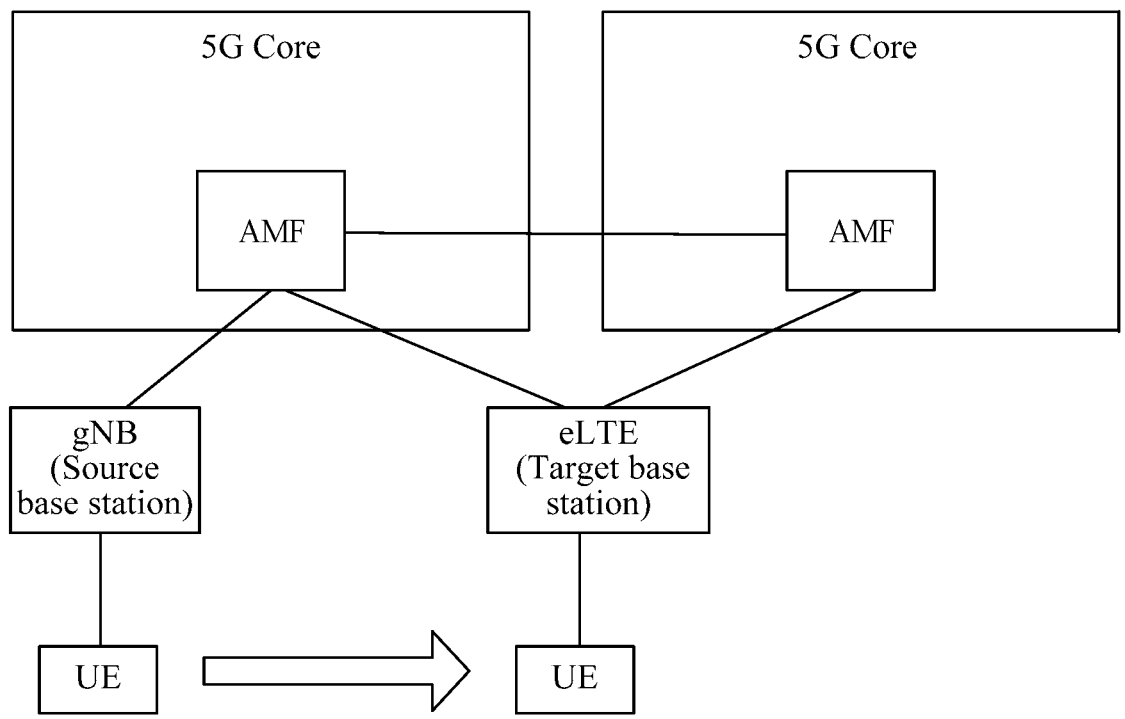
FIG. 17 is a structure diagram of another network handover system according to the embodiments of the present disclosure.

FIG. 17 is a structure diagram of another network handover system according to the embodiments of the present disclosure. As shown in FIG. 17, two types of base stations present in the 5G system. One is a new radio access technology (New RAT) base station (gNB) and the other may be an evolved LTE technology base station (eLTE). At this time, the handover of the UE from the gNB to the eLTE connected to the 5G core network is an intra-system handover in 5G.

Figure 18:
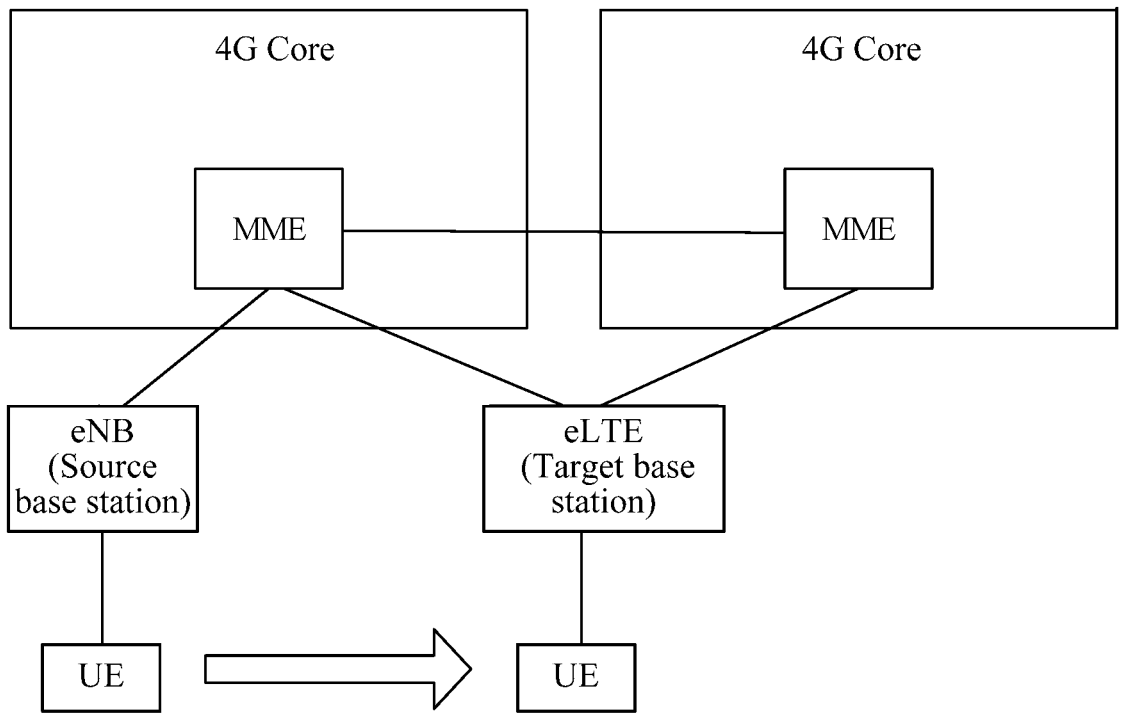
FIG. 18 is a structure diagram of another network handover system according to the embodiments of the present disclosure.

FIG. 18 is a structure diagram of another network handover system according to the embodiments of the present disclosure. As shown in FIG. 18, two types of base stations present in the 4G system which may be a conventional eNB base station and an evolved LTE technology base station (eLTE). At this time, the handover of the UE from the eNB to the eLTE connected to the 4G core network is an intra-system handover in 4G.

Figure 19:
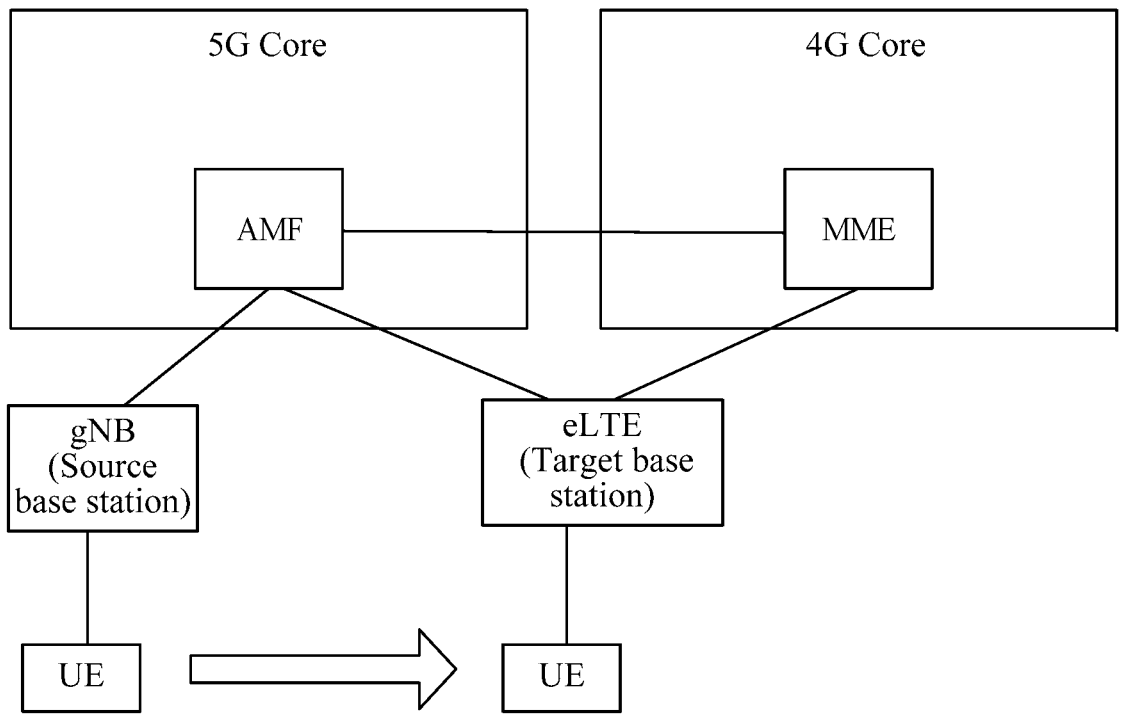
FIG. 19 is a structure diagram of another network handover system according to the embodiments of the present disclosure.
Figure 20:
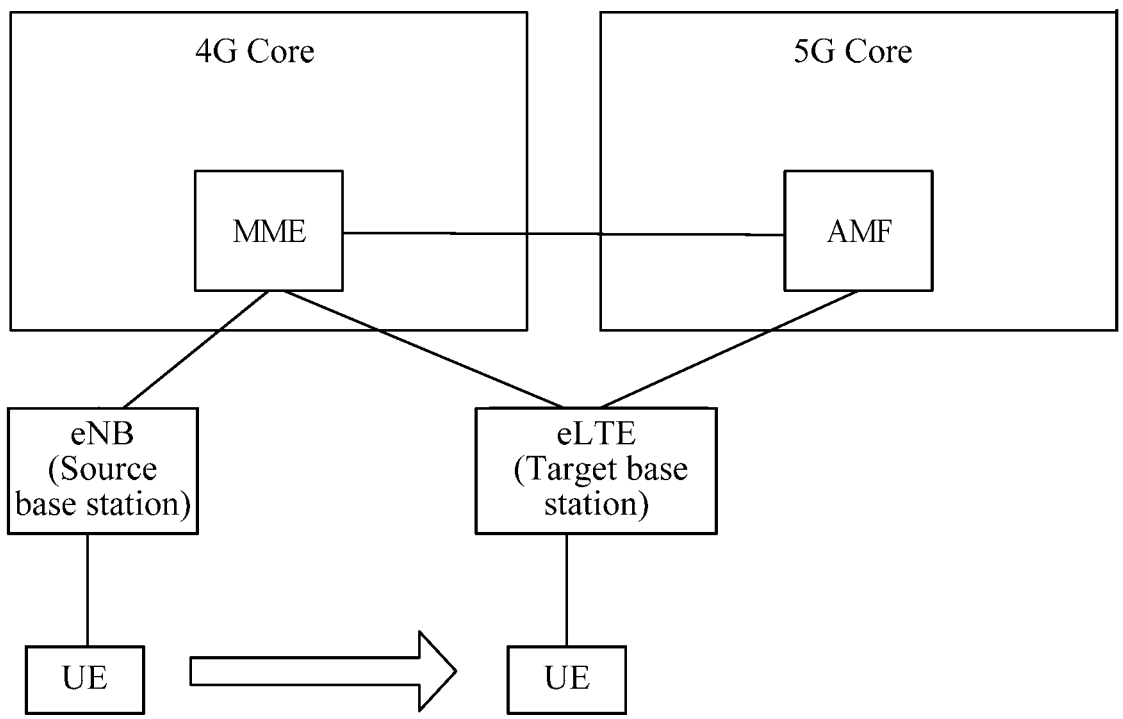
FIG. 20 is a structure diagram of another network handover system according to the embodiments of the present disclosure.

FIG. 19 is a structure diagram of another network handover system according to the embodiments of the present disclosure. FIG. 20 is a structure diagram of another network handover system according to the embodiments of the present disclosure. As shown in FIG. 19 and FIG. 20, a handover between the gNB or the eLTE connected to the 5G core network and the eLTE or the eNB connected to the 4G core network is an inter-system handover.

Embodiment Six

A storage medium is further provided in the embodiment of the present disclosure. A computer is stored on the storage medium. When the computer program is executed, the steps in any above-mentioned method are performed.

Optionally, in the embodiment, the above storage medium stores the computer program for performing steps described below.

In S1, a mobility management function in a core network of a first network receives a first handover request sent by a source base station connected to the core network of the first network, where the first handover request is used for requesting a handover of a user equipment (UE) connected to the source base station from the source base station to a target base station, and the target base station is connected to the core network of the first network and/or a core network of a second network.

In S2, the mobility management function determines, according to the first handover request, a core network of a target network accessed by the UE through the target base station after the handover, where the core network of the target network is the core network of the first network or the core network of the second network.

In S3, the mobility management function initiates the handover of the UE between the source base station and the target base station according to the core network of the target network.

Optionally, in the embodiment, the above-mentioned storage medium may include, but is not limited to, a USB flash disk, a read-only memory (ROM), a random access memory (RAM), a mobile hard disk, a magnetic disk, an optical disk or another medium capable of storing a computer program.

The embodiments of the present disclosure further provide an apparatus which includes a memory and a processor. A computer program is stored on the memory and the processor is configured to execute the computer program for performing the steps in any above-mentioned methods according to the embodiments.

Optionally, the electronic apparatus described above may further include a transmission device and an input and output device, where both the transmission device and the input and output device are connected to the processor described above.

Optionally, in this embodiment, the processor may be configured to perform the steps described below through the computer program.

In S1, a mobility management function located in a core network of a first network receives a first handover request sent by a source base station connected to the core network of the first network, where the first handover request is used for requesting a handover of a user equipment (UE) connected to the source base station from the source base station to a target base station, and the target base station is connected to the core network of the first network and/or a core network of a second network.

In S2, the mobility management function determines, according to the first handover request, a core network of a target network accessed by the UE through the target base station after the handover, where the core network of the target network is the core network of the first network or the core network of the second network.

In S3, the mobility management function initiates the handover of the UE between the source base station and the target base station according to the core network of the target network.

Optionally, for specific examples in the embodiment, reference may be made to the examples described in the above-mentioned embodiments and optional implementations, and repetition is not made here.

Embodiment Seven

A storage medium is further provided in the embodiment of the present disclosure. A computer program is stored on the storage medium, when executed, the steps in any above-mentioned method embodiment are performed.

Optionally, in this embodiment, the above storage medium may store a computer program for performing steps described below.

In S1, a source base station connected to a core network of a first network receives a measurement report sent by a user equipment (UE) to determine a target base station to which a handover is to be performed, where the target base station is connected to the core network of the first network and/or a core network of a second network.

In S2, the source base station sends a first handover request to a mobility management function located in the core network of the first network, where the first handover request is used for requesting the handover of the UE from a connection to the source base station to a connection to the target base station and indicating information about a core network of a target network accessed by the UE through the target base station after the handover.

Optionally, in the embodiment, the above-mentioned storage medium may include, but is not limited to, a USB flash disk, a read-only memory (ROM), a random access memory (RAM), a mobile hard disk, a magnetic disk, an optical disk or another medium capable of storing a computer program.

An electronic apparatus is further provided in the embodiment of the present disclosure, and includes a memory and a processor. A computer program is stored on the storage medium and the processor is configured to execute the computer program for performing the steps in any above-mentioned method according to the embodiments.

Optionally, the electronic apparatus described above may further include a transmission device and an input and output device, where both the transmission device and the input and output device are connected to the processor described above.

Optionally, in the embodiment, the processor may be configured to perform steps described below through a computer program.

In S1, a source base station connected to a core network of a first network receives a measurement report sent by a user equipment (UE) to determine a target base station to which a handover is to be performed, where the target base station is connected to the core network of the first network and/or a core network of a second network.

In S2, the source base station sends a first handover request to a mobility management function located in the core network of the first network, where the first handover request is used for requesting the handover of the UE from a connection to the source base station to a connection to the target base station and indicating information about a core network of a target network accessed by the UE through the target base station after the handover.

Optionally, for specific examples in the embodiment, reference may be made to the examples described in the above-mentioned embodiments and optional implementations, and repetition is not made here.

Apparently, it should be understood by those skilled in the art that each of the modules or steps of the present application described above may be implemented by a general-purpose computing apparatus, the modules or steps may be concentrated on a single computing apparatus or distributed on a network composed of multiple computing apparatuses, and optionally, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any particular combination of hardware and software.

The above are merely preferred embodiments of the present application and are not intended to limit the present application. For those skilled in the art, the present application may have various modifications and variations. Any modification, equivalent substitution, improvement and the like made within the principle of the present disclosure should fall within the protection scope of the present application.

What is claimed is:

1. A network handover method, comprising:
    receiving, by a mobility management function in a core network of a first network, a first handover request sent by a source base station connected to the core network of the first network, wherein the first handover request is used for requesting a handover of a user equipment (UE) connected to the source base station from the source base station to a target base station, and the target base station is connected to at least one of the core network of the first network or a core network of a second network;
    determining, by the mobility management function according to the first handover request, a core network of a target network accessed by the UE through the target base station after the handover, wherein the core network of the target network is the core network of the first network or the core network of the second network; and
    initiating, by the mobility management function, the handover of the UE between the source base station and the target base station according to the core network of the target network;
    wherein before receiving, by the mobility management function, the first handover request sent by the source base station, the method further comprises: sending, by the mobility management function, a handover preference type of the target network to the source base station, wherein the handover preference type is used for indicating the core network of the first network or the core network of the second network; and wherein determining, by the mobility management function, the core network of the target network accessed by the UE through the target base station after the handover comprises: in a case where the first handover request does not carry information for indicating the core network of the target network, determining, by the mobility management function, a core network accessed by the UE through the target base station after the handover is a core network indicated by the handover preference type.

2. The method of claim 1, wherein initiating, by the mobility management function, the handover of the UE between the source base station and the target base station according to the core network of the target network comprises:
in response to the UE accessing the core network of the first network through the target base station, initiating, by the mobility management function, an intra-system handover; and in response to the UE accessing the core network of the second network through the target base station, initiating, by the mobility management function, an inter-system handover.

3. The method of claim 1, wherein the first handover request carries information for indicating the core network of the target network.

4. The method of claim 1, wherein determining, by the mobility management function, the core network of the target network accessed by the UE through the target base station after the handover comprises:
in a case where the mobility management function fails to determine, according to the first handover request, the core network of the target network accessed by the UE through the target base station after the handover, sending, by the mobility management function, a second handover request to the source base station;
receiving, by the mobility management function, response information sent in response to the second handover request by the source base station, wherein the response information is used for indicating the core network of the target network; and
determining, by the mobility management function, that a core network accessed by the UE through the target base station after the handover is the core network of the target network indicated by the response information.

5. The method of claim 1, wherein
in a case where the core network of the first network is a core network of a 5G network, the core network of the second network is a core network of a 4G network;
in a case where the core network of the first network is the core network of the 4G network, the core network of the second network is the core network of the 5G network;
in a case where the first network is a 4G network, the mobility management function is a mobility management entity (MME); and
in a case where the first network is a 5G network, the mobility management function is an access and mobility control function (AMF).

6. A non-transitory storage medium storing a computer program, wherein when the computer program is executed, the method of claim 1 is performed.

7. An electronic apparatus, comprising a memory and a processor, wherein the memory stores a computer program, and the processor is configured to execute the computer program to perform the method of claim 1.

8. A network handover determination method, comprising:
receiving, by a source base station connected to a core network of a first network, a measurement report sent by a user equipment (UE) to determine a target base station to which a handover is to be performed, wherein the target base station is connected to at least one of the core network of the first network or a core network of a second network; and
sending, by the source base station, a first handover request to a mobility management function in the core network of the first network, wherein the first handover request is used for requesting the handover of the UE from a connection to the source base station to a connection to the target base station and indicating information about a core network of a target network accessed by the UE through the target base station after the handover;
wherein before sending, by the source base station, the first handover request to the mobility management function, the method further comprises:
receiving, by the source base station, a handover preference type of the target network sent by the mobility management function, wherein the handover preference type is used for indicating the core network of the first network or the core network of the second network; and
carrying, by the source base station according to the handover preference type, the information about the core network of the target network responding to the handover preference type in the first handover request; and
wherein the method further comprises:
receiving, by the source base station, a second handover request sent by the mobility management function, wherein the second handover request is a request sent in a case where the mobility management function fails to determine, according to the first handover request, the core network of the target network accessed by the UE through the target base station after the handover; and
sending, by the source base station to the mobility management function, response information sent in response to the second handover request, wherein the response information is used for indicating the core network of the target network.

9. The method of claim 8, wherein the first handover request carries information for indicating the core network of the target network.

10. The method of claim 8, wherein in a case where the core network of the first network is a core network of a 5G network, the core network of the second network is a core network of a 4G network; and in a case where the core network of the first network is the core network of the 4G network, the core network of the second network is the core network of the 5G network;
in a case where the first network is a 4G network, the mobility management function is a mobility management entity (MME); and in a case where the first network is a 5G network, the mobility management function is an access and mobility control function (AMF).

11. A non-transitory storage medium storing a computer program, wherein when the computer program is executed, the method of claim 8 is performed.

12. An electronic apparatus, comprising a memory and a processor, wherein the memory stores a computer program, and the processor is configured to execute the computer program to perform the method of claim 8.

13. A network handover system, comprising a source base station, a mobility management function, a user equipment (UE) and a target base station, wherein the source base station is connected to a core network of a first network, the mobility management function is located in the core network of the first network, the UE is connected to the source base station, and the target base station is connected to at least one of the core network of the first network or a core network of a second network;

wherein the source base station is configured to receive a measurement report sent by the UE to determine the target base station to which a handover is to be performed; receive a handover preference type of a target network sent by the mobility management function; and send a first handover request to the mobility management function; and the mobility management function is configured to send the handover preference type of the target network to the source base station; receive the first handover request sent by the source base station; determine, according to the first handover request, a core network of the target network accessed by the UE through the target base station after the handover; and initiate the handover of the UE between the source base station and the target base station according to the core network of the target network; wherein the core network of the target network is the core network of the first network or the core network of the second network;

wherein the handover preference type is used for indicating the core network of the first network or the core network of the second network; and wherein in a case where the first handover request does not carry information for indicating the core network of the target network, the mobility management function is configured to determine a core network accessed by the UE through the target base station after the handover is a core network indicated by the handover preference type.

14. The system of claim 13, wherein in a case where the core network of the first network is a core network of a 5G network, the core network of the second network is a core network of a 4G network; and in a case where the core network of the first network is the core network of the 4G network, the core network of the second network is the core network of the 5G network;

wherein in a case where the first network is a 4G network, the mobility management function is a mobility management entity (MME); and in a case where the first network is a 5G network, the mobility management function is an access and mobility control function (AMF).

\* \* \* \* \*

UNITED STATES PATENT AND TRADEMARK OFFICE
CERTIFICATE OF CORRECTION

PATENT NO. : 11,503,523 B2
APPLICATION NO. : 16/970173
DATED : November 15, 2022
INVENTOR(S) : Zhendong Li Page 1 of 1

It is certified that error appears in the above-identified patent and that said Letters Patent is hereby corrected as shown below:

In the Specification

Column 9, Line 15 (approx.), delete "(FPGA))." and insert -- (FPGA). --.

Column 12, Line 51, delete "Qos" and insert -- QoS --.

Signed and Sealed this
Twenty-seventh Day of August, 2024

Katherine Kelly Vidal
*Director of the United States Patent and Trademark Office*